United States Patent
Kim et al.

(10) Patent No.: US 10,920,016 B2
(45) Date of Patent: Feb. 16, 2021

(54) POLYMERIZABLE COMPOSITION

(71) Applicant: LG CHEM, LTD., Seoul (KR)

(72) Inventors: Sang Woo Kim, Daejeon (KR); Seung Hee Lee, Daejeon (KR); Ki Ho Ahn, Daejeon (KR); Yulliana Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 9 days.

(21) Appl. No.: 16/341,661

(22) PCT Filed: Nov. 28, 2017

(86) PCT No.: PCT/KR2017/013685
§ 371 (c)(1),
(2) Date: Apr. 12, 2019

(87) PCT Pub. No.: WO2018/101703
PCT Pub. Date: Jun. 7, 2018

(65) Prior Publication Data
US 2019/0367675 A1 Dec. 5, 2019

(30) Foreign Application Priority Data
Nov. 29, 2016 (KR) .................... 10-2016-0160020

(51) Int. Cl.
| C08G 73/10 | (2006.01) |
| C08K 3/04 | (2006.01) |
| C08K 3/08 | (2006.01) |
| C08K 3/22 | (2006.01) |
| C08K 3/40 | (2006.01) |
| C08L 79/08 | (2006.01) |

(52) U.S. Cl.
CPC .............. C08G 73/10 (2013.01); C08K 3/04 (2013.01); C08K 3/08 (2013.01); C08K 3/22 (2013.01); C08K 3/40 (2013.01); C08L 79/08 (2013.01)

(58) Field of Classification Search
CPC .................................................. C08G 69/32
See application file for complete search history.

(56) References Cited

U.S. PATENT DOCUMENTS

| 2,628,218 | A | * | 2/1953 | Magat | ................ | C08G 69/00 |
| | | | | | | 528/288 |
| 4,408,035 | A | * | 10/1983 | Keller | ................ | C08G 73/0672 |
| | | | | | | 524/592 |
| 4,480,082 | A | * | 10/1984 | McLean | ................ | C08G 59/44 |
| | | | | | | 528/103 |
| 4,749,776 | A | * | 6/1988 | Sentman | ................ | C08G 69/28 |
| | | | | | | 528/312 |
| 5,003,039 | A | | 3/1991 | Keller | | |
| 5,237,045 | A | * | 8/1993 | Burchill | ................ | C08G 73/06 |
| | | | | | | 528/171 |
| 5,925,475 | A | * | 7/1999 | Sastri | ................ | C08G 73/1003 |
| | | | | | | 428/704 |
| 6,001,926 | A | | 12/1999 | Sastri et al. | | |
| 2011/0108755 | A1 | | 5/2011 | Laskoski et al. | | |
| 2016/0168326 | A1 | * | 6/2016 | Laskoski | ................ | C07F 7/0838 |
| | | | | | | 528/210 |
| 2019/0276605 | A1 | * | 9/2019 | Ahn | ................ | C08G 75/12 |

FOREIGN PATENT DOCUMENTS

| EP | 3385302 A1 | 10/2018 |
| EP | 3533799 A1 | 9/2019 |
| JP | 2005097428 A | 4/2005 |
| JP | 2008-530309 A | 8/2008 |
| KR | 10-0558158 B1 | 3/2006 |
| KR | 10-2014-0081551 A | 7/2014 |
| KR | 10-2016-0115543 A | 10/2016 |

OTHER PUBLICATIONS

XP055520875: Satya B. Sastri et al, "Phthalonitrile Cure Reaction with Aromatic Diamines", Journal of Polymer science, Part A, vol. 36, No. 11, Aug. 1, 1998, pp. 1885-1890.
XP055612782: Mehdi Derradji et al, "Mechanical and thermal properties of phthalonitrile resin reinforced with silicon carbide particles", Materials and Design, vol. 71, Feb. 7, 2015, pp. 48-55.

* cited by examiner

*Primary Examiner* — Liam J Heincer
(74) *Attorney, Agent, or Firm* — Dentons US LLP

(57) ABSTRACT

The present application relates to a polymerizable composition, a prepolymer, a phthalonitrile resin, a composite, a method for producing the same, and a use thereof. The present application can provide a polymerizable composition, a prepolymer and a phthalonitrile resin capable of forming a composite showing proper curing property, melting temperature and process window and having excellent physical properties such as heat resistance and rigidity.

9 Claims, 14 Drawing Sheets

[Figure 1]
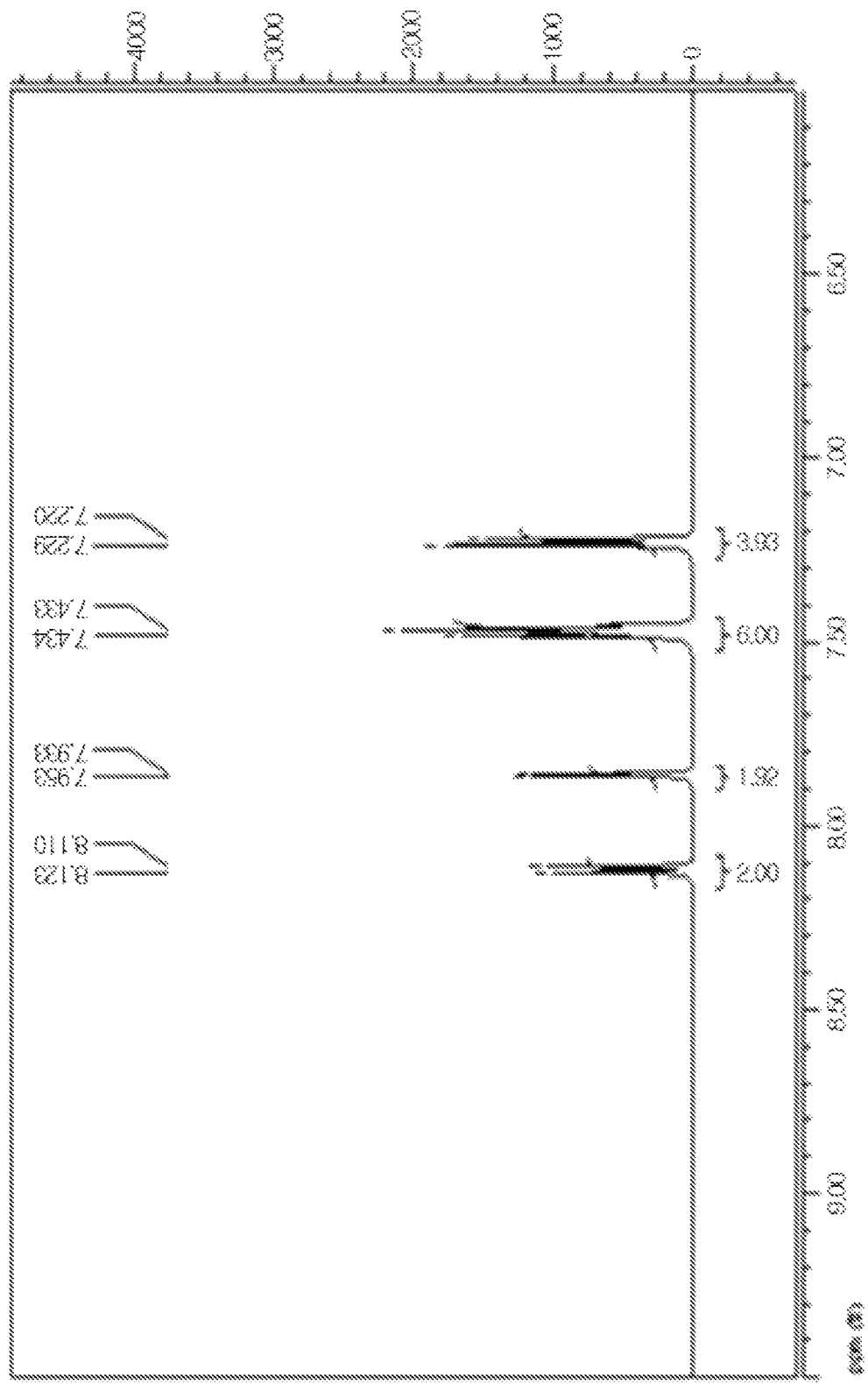

[Figure 2]
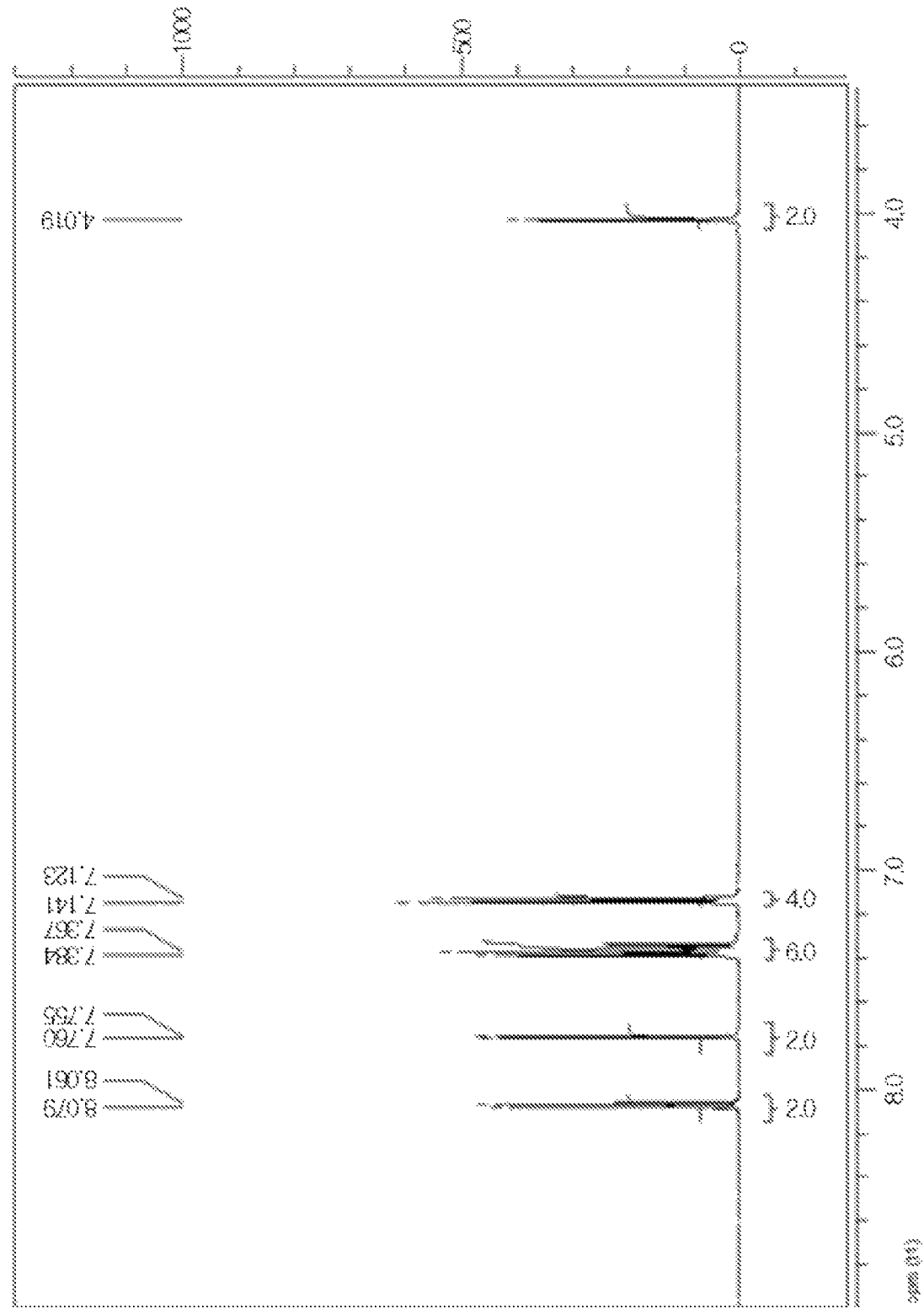

[Figure 3]
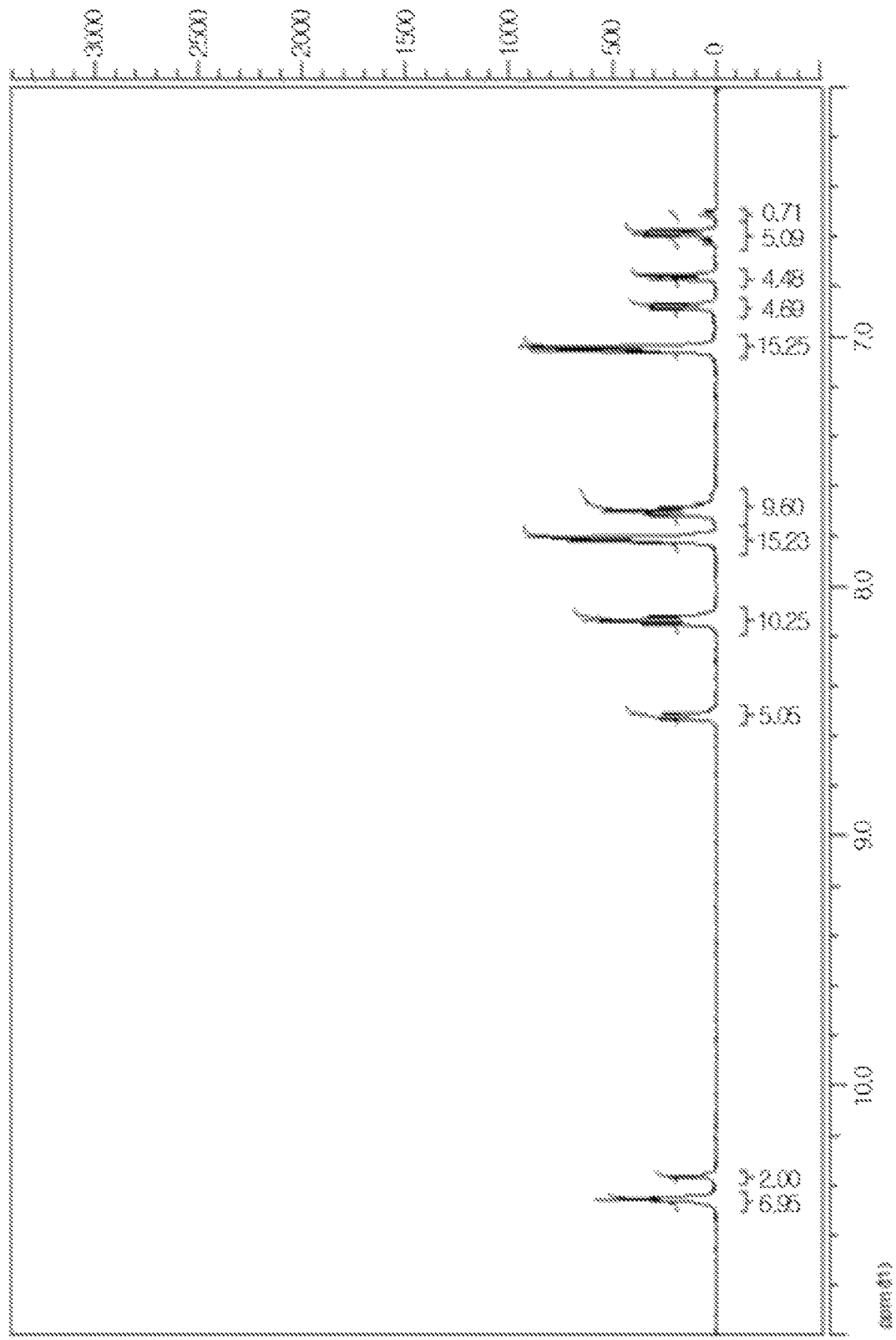

[Figure 4]
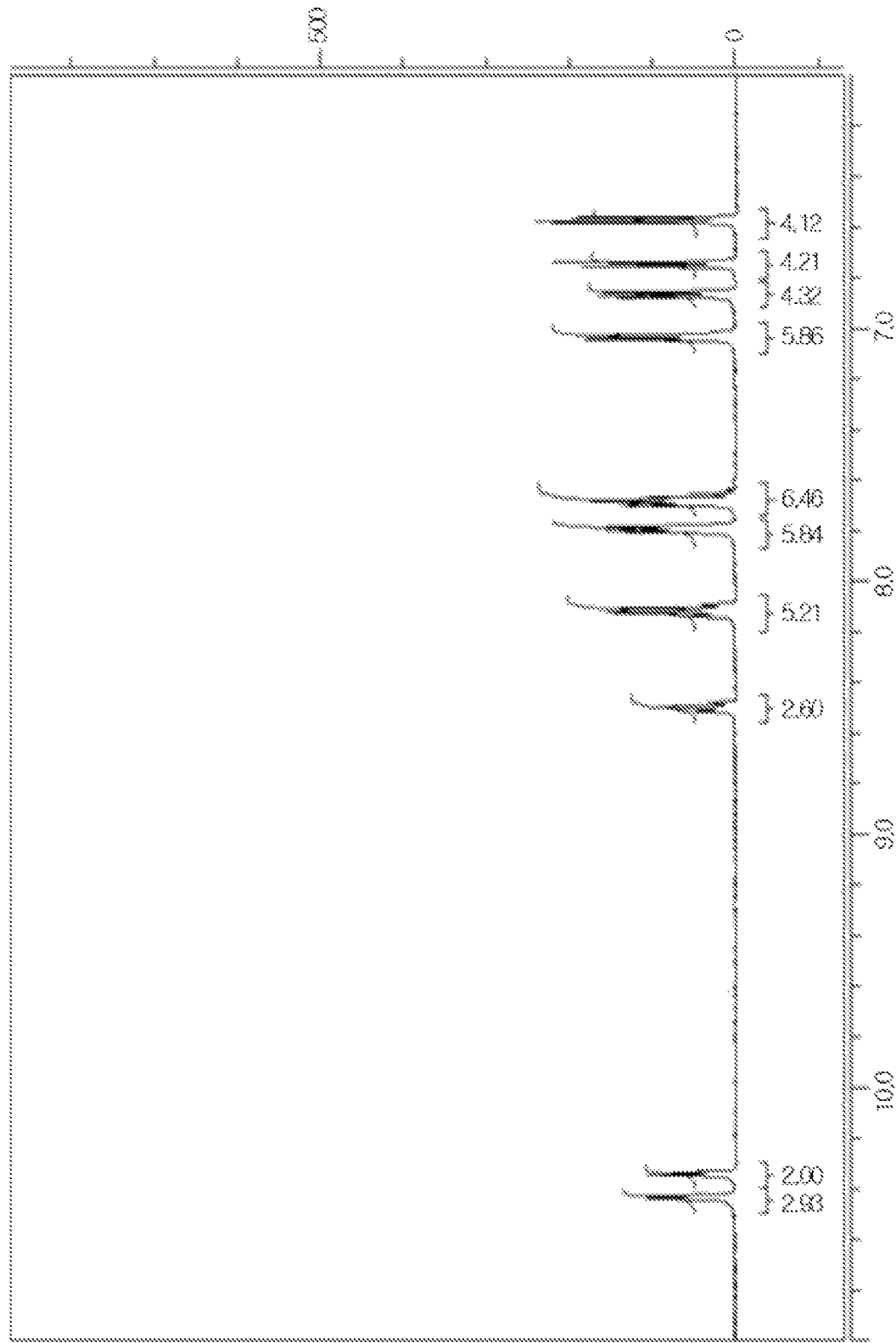

[Figure 5]
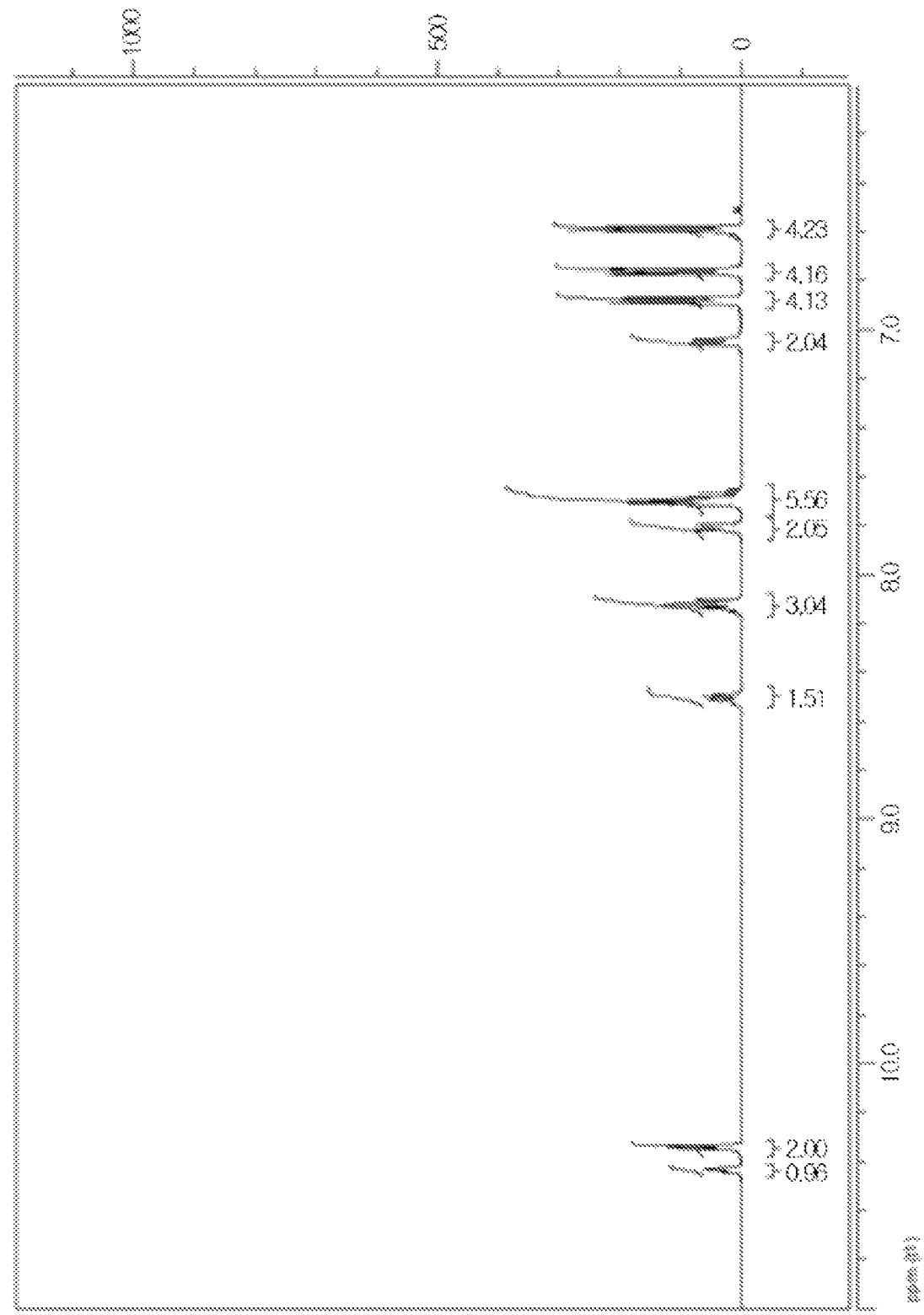

[Figure 6]
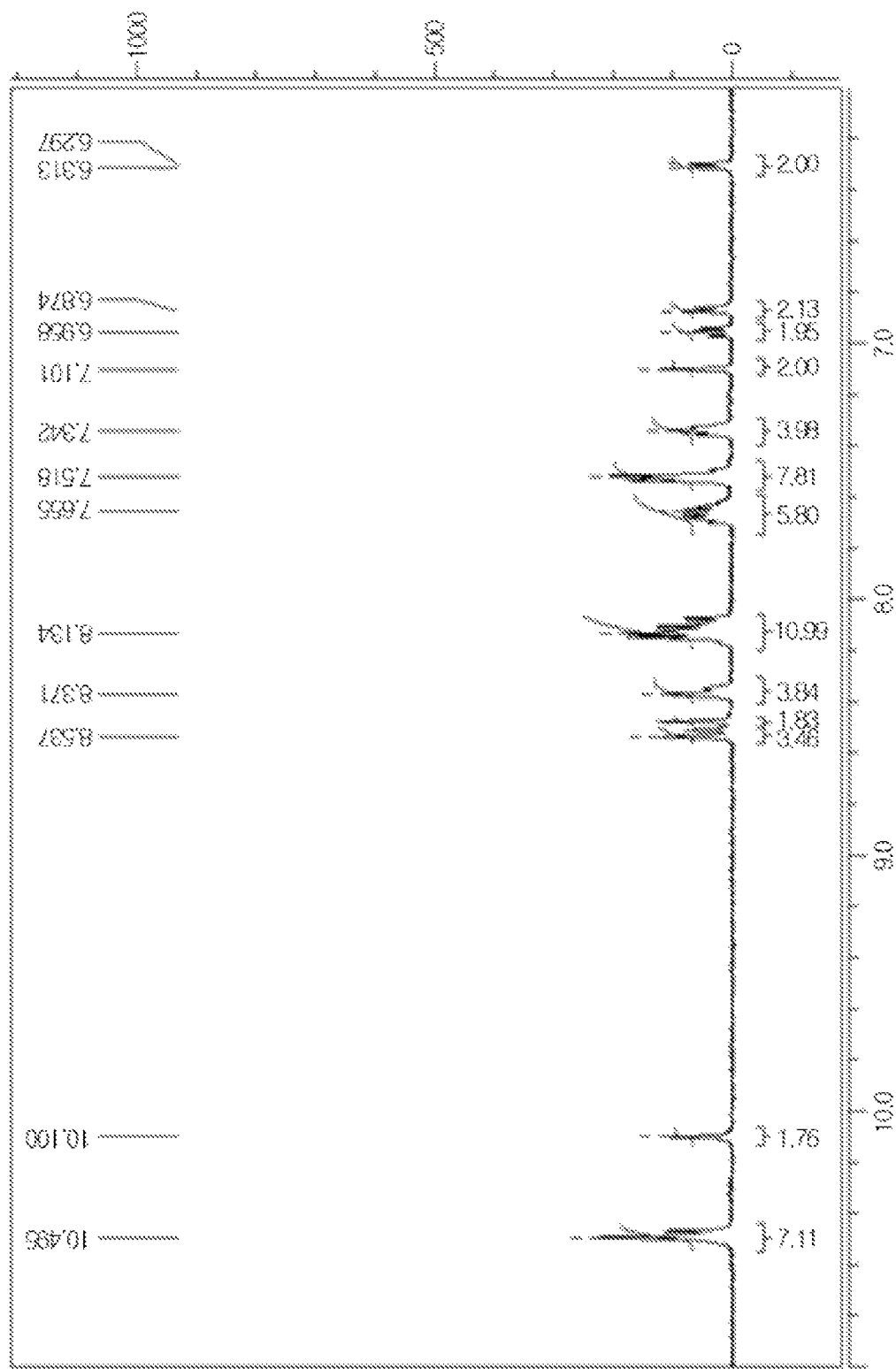

[Figure 7]
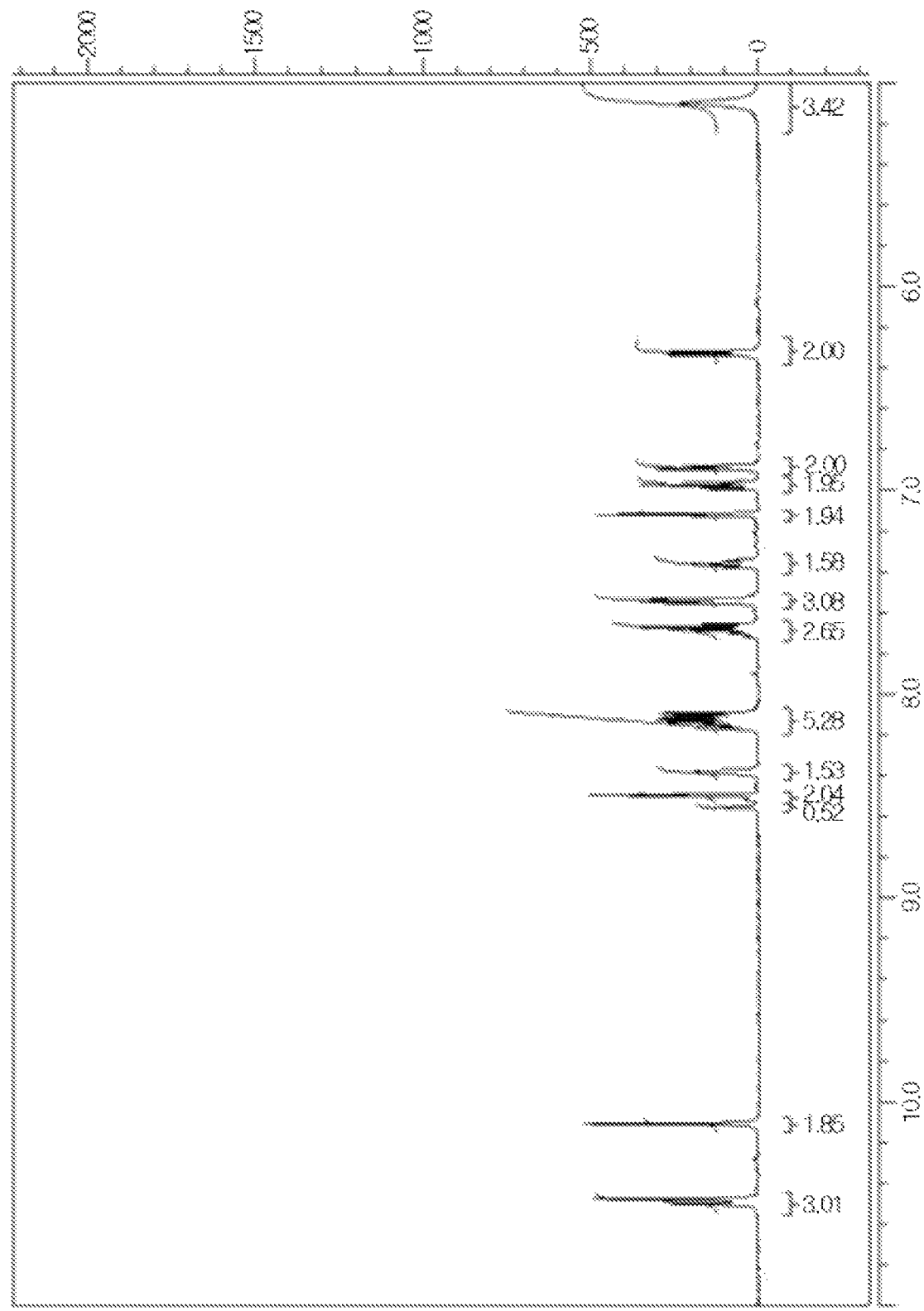

[Figure 8]
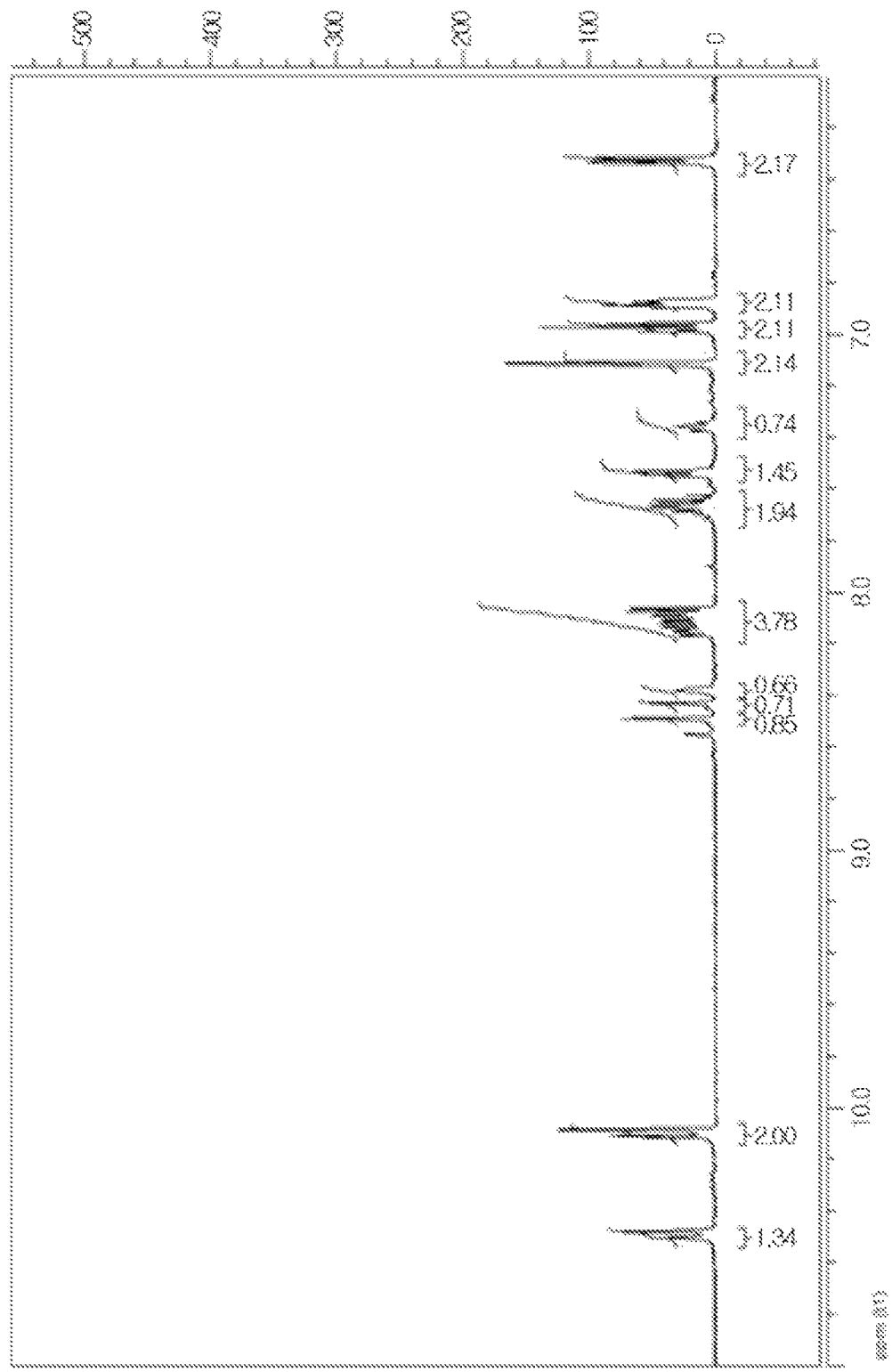

[Figure 9]
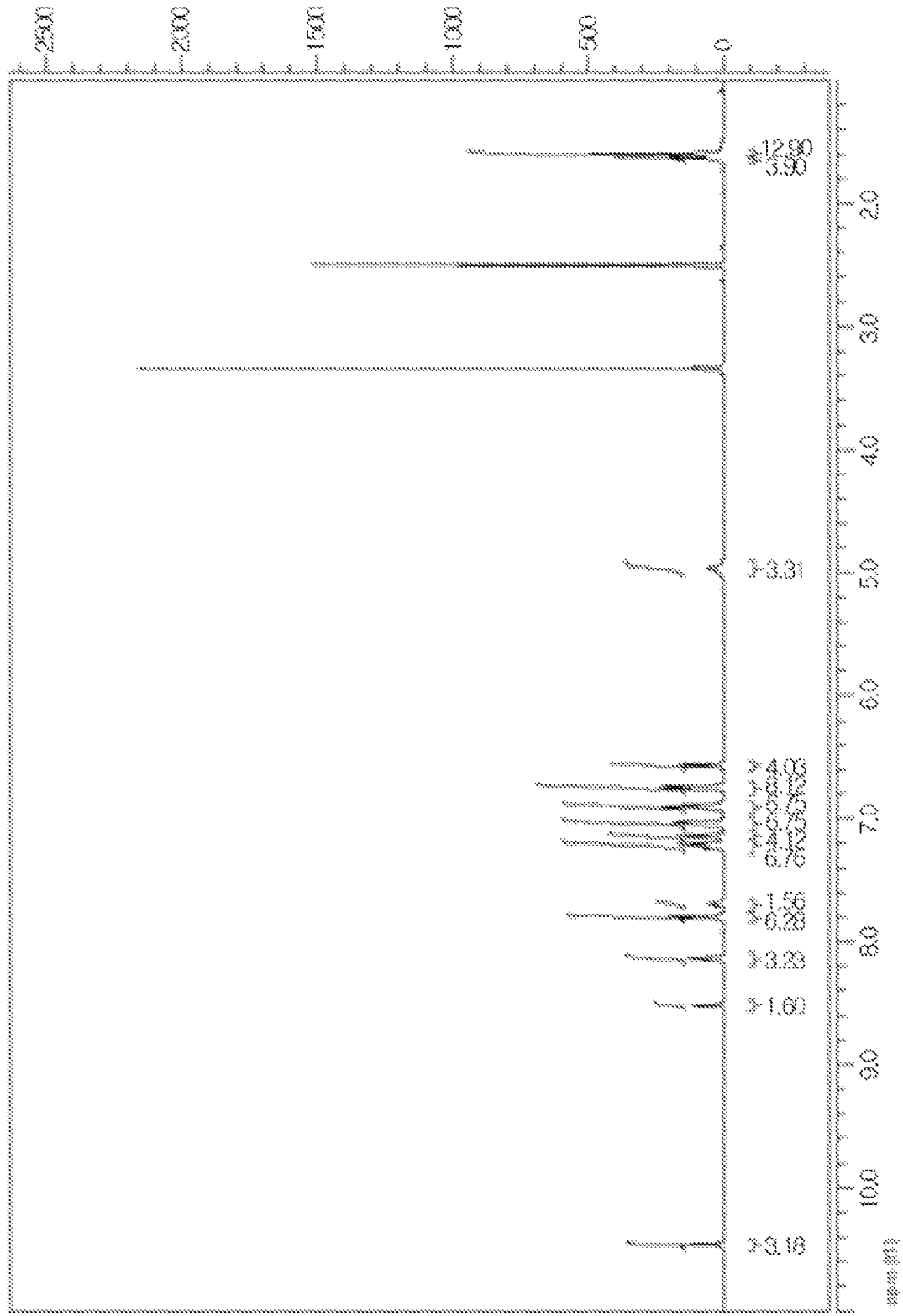

[Figure 10]
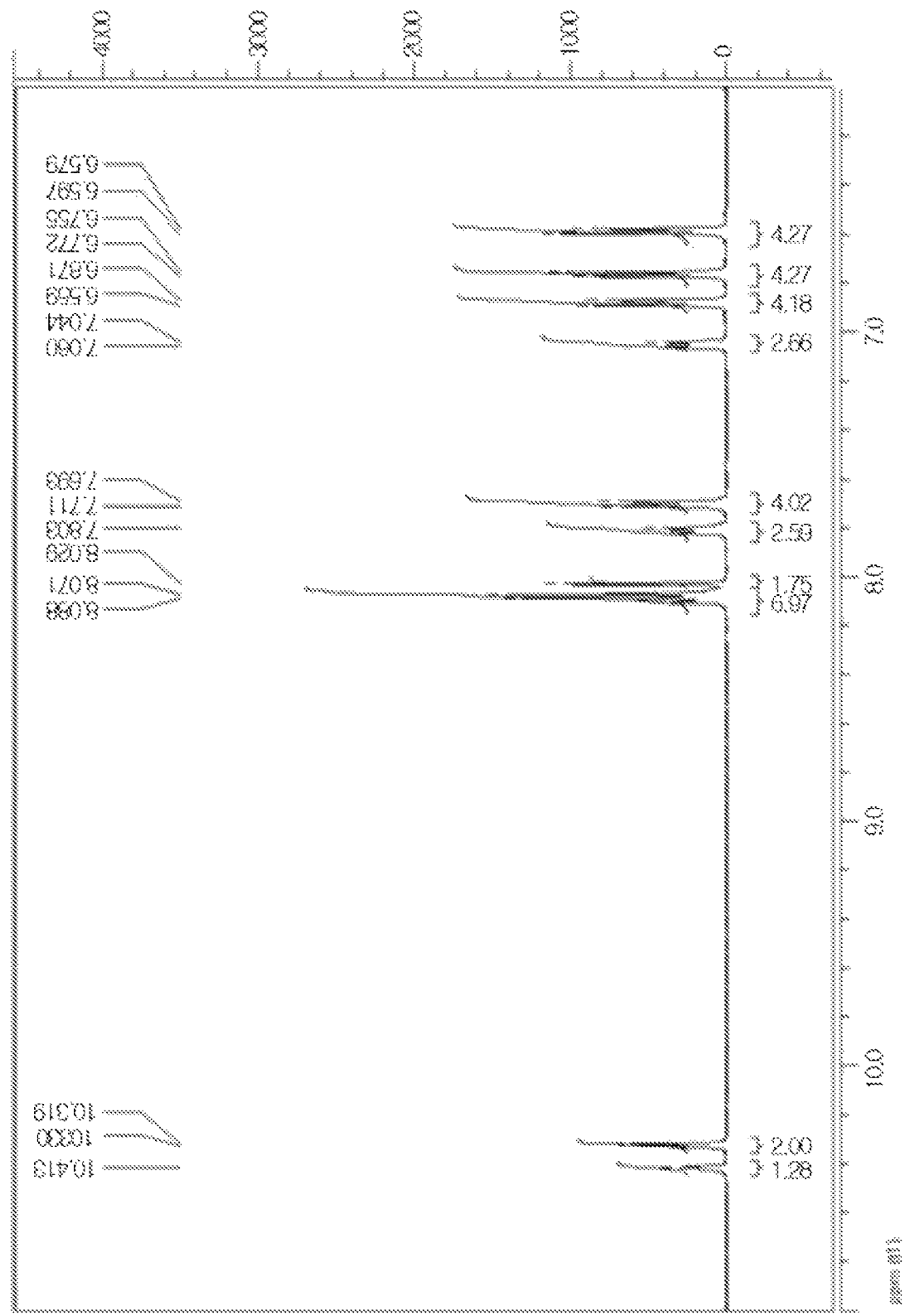

[Figure 11]
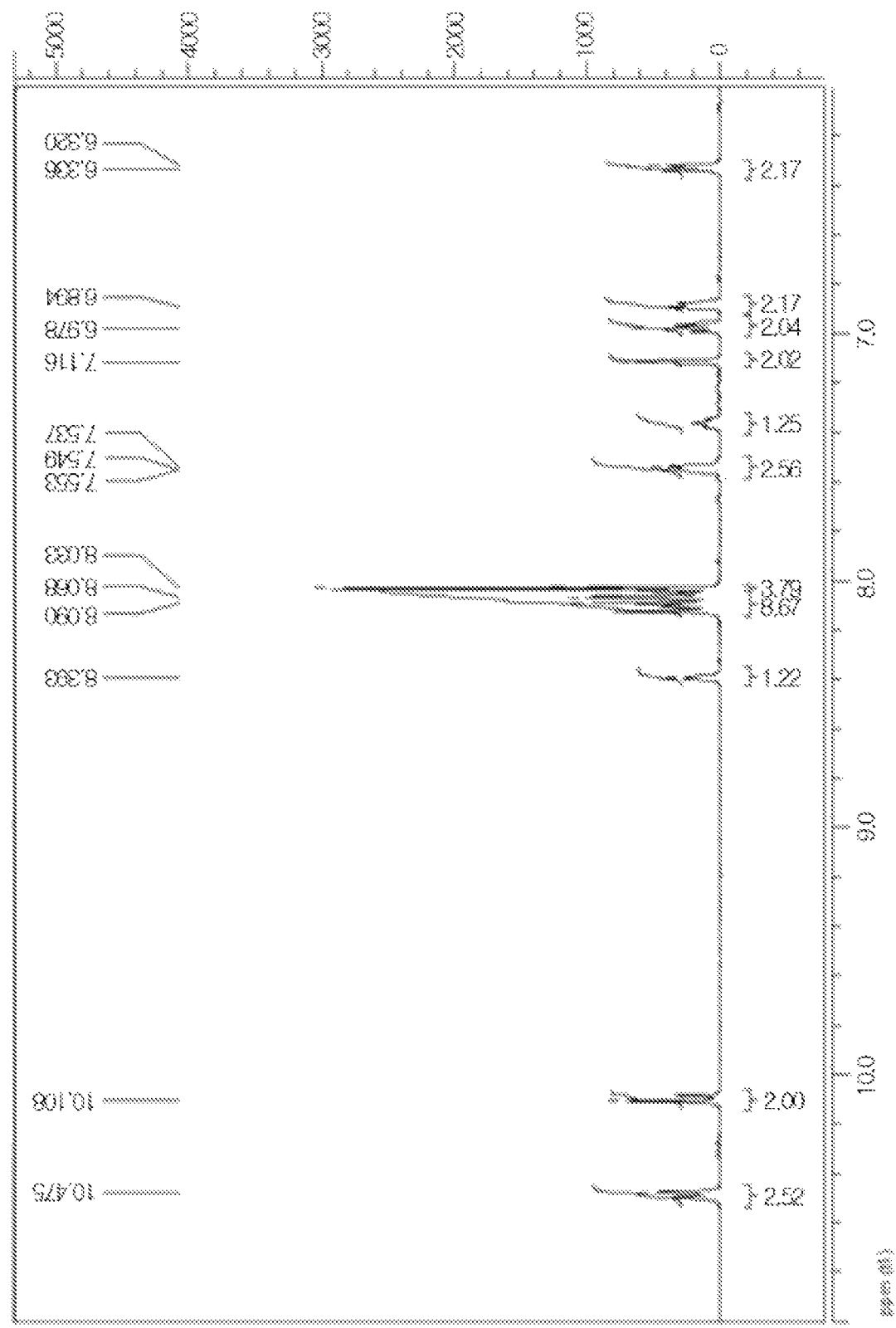

[Figure 12]
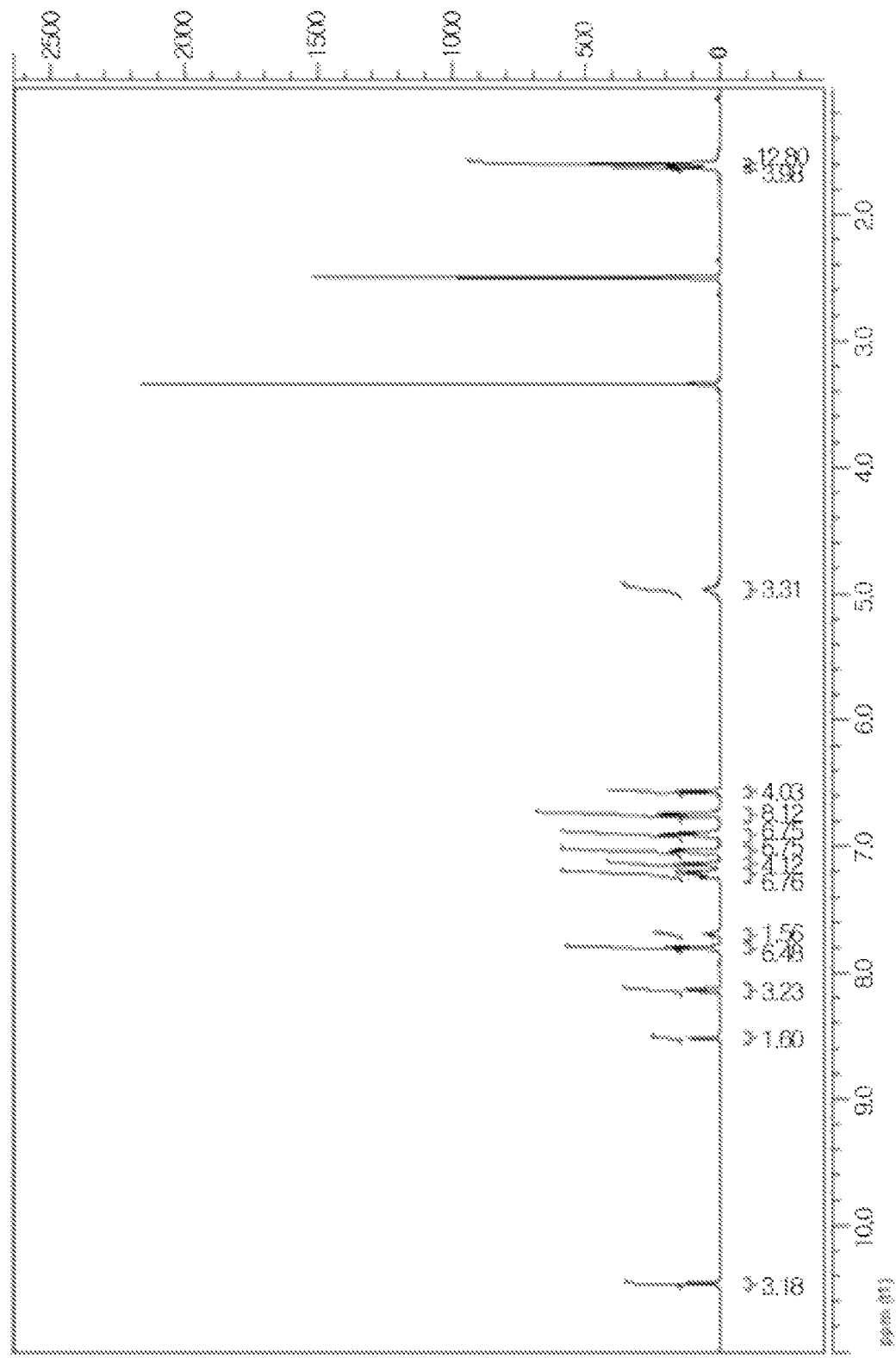

[Figure 13]
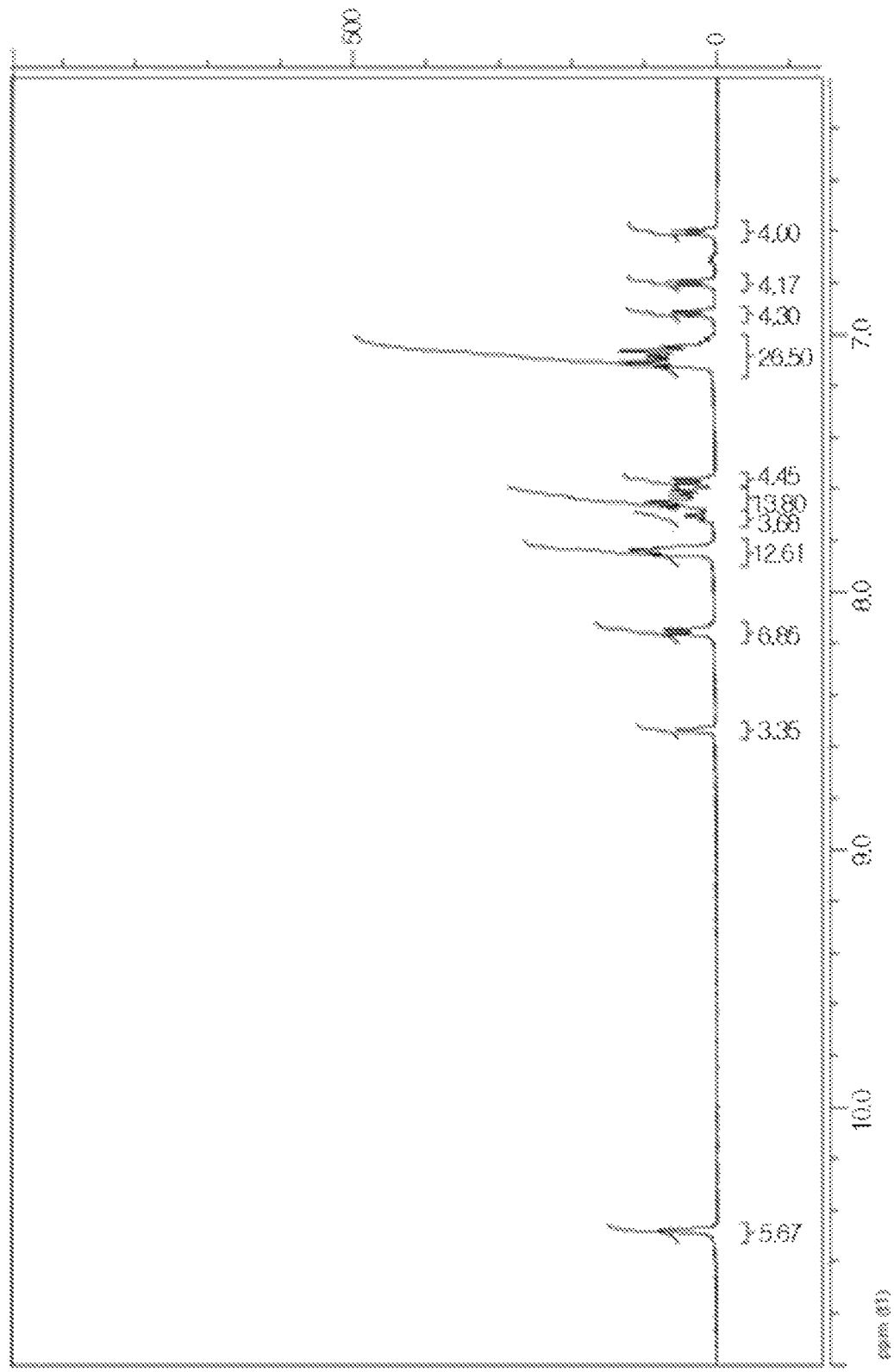

[Figure 14]
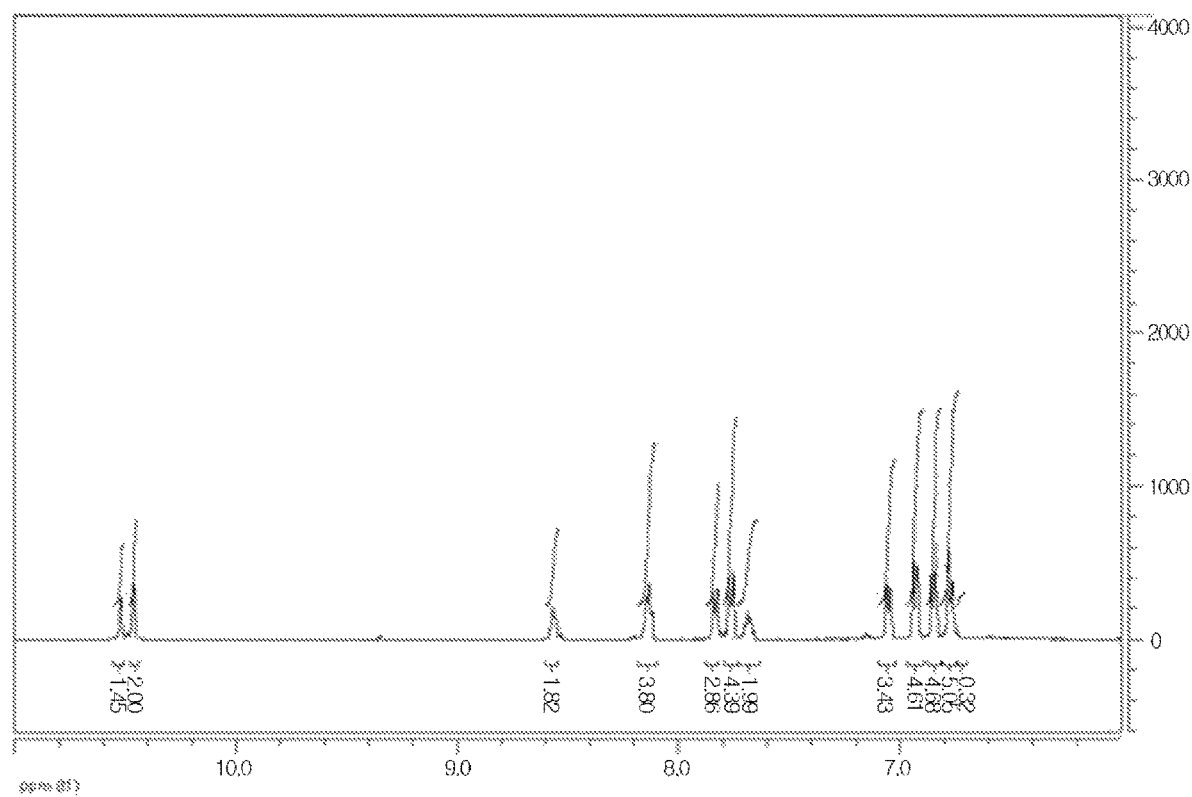

POLYMERIZABLE COMPOSITION

TECHNICAL FIELD

The present application is a National Phase of PCT International Application No. PCT/KR2017/013685, filed on Nov. 28, 2017, which claims the benefit of priority based on Korean Patent Application No. 10-2016-0160020 filed on Nov. 29, 2016, the disclosure of which is incorporated herein by reference in its entirety.

The present application relates to a polymerizable composition, a prepolymer, a phthalonitrile resin, a composite, a method for producing the same, and a use thereof.

BACKGROUND ART

The phthalonitrile resin can be used in various applications. For example, a composite formed by impregnating a filler such as glass fiber or carbon fiber with the phthalonitrile resin can be used as a material for automobiles, airplanes, ships, and the like. The process for producing the composite may include, for example, a process of mixing a mixture of phthalonitrile and a curing agent or a prepolymer formed by reaction of the mixture with a filler and then curing the mixture (see, for example, Patent Document 1).

PRIOR ART DOCUMENTS

Patent Documents (Patent Document 1) Korean Patent No. 0558158

DISCLOSURE

Technical Problem

The present application provides a polymerizable composition, a prepolymer, a phthalonitrile resin, a composite, a method for producing the same, and a use thereof.

Technical Solution

The present application relates to a polymerizable composition. In one example, the polymerizable composition may be a composition capable of forming a so-called phthalonitrile resin through a polymerization reaction. The polymerizable composition may comprise a phthalonitrile compound and a curing agent. In the present application, the phthalonitrile compound and the curing agent may be contained as a main component in the polymerizable composition. In the present application, the term main component may mean a case where the relevant component is contained in a weight ratio of about 55% or more, 60% or more, 65% or more, 70% or more, 75% or more, 80% or more, 85% or more, or 90% or more. Here, the upper limit of the ratio of the component contained as the main component is not particularly limited, which may be, for example, about 100% or less, or 99% or less. In addition, the ratios of the phthalonitrile compound and the curing agent are ratios in the solid content of the polymerizable composition.

The kind of the phthalonitrile compound usable in the polymerizable composition is not particularly limited, and for example, a compound comprising 1 or more, 2 or more, 2 to 20, 2 to 16, 2 to 12, 2 to 8, or 2 to 4 phthalonitrile structures which are capable of forming a phthalonitrile resin through reaction with a curing agent, can be used. There are various compounds known to be suitable for forming the phthalonitrile resin, and in the present application, all of the above known compounds can be used. In one example, as examples of the compounds, those known in U.S. Pat. Nos. 4,408,035, 5,003,039, 5,003,078, 5,004,801, 5,132,396, 5,139,054, 5,208,318, 5,237,045, 5,292,854 or U.S. Pat. No. 5,350,828 can be exemplified, and various compounds known in the art, besides those mentioned by above documents, can be included in the examples.

In one example, the phthalonitrile compound that can be applied may be exemplified by a compound represented by Formula 4 below, but is not limited thereto.

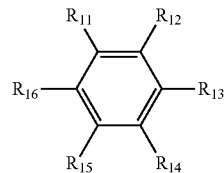

[Formula 4]

In Formula 4, $R_{11}$ to $R_{16}$ are each independently a hydrogen atom, an alkyl group, an alkenyl group, an alkynyl group, an alkoxy group, an aryl group or a substituent of Formula 5 or 6 below. In Formula 4, at least two or two to three of $R_{11}$ to $R_{16}$ may be a substituent of Formula 5 or 6 below.

Substituents of Formula 5 or 6 in which at least two or two to three are present in Formula 4 may be present at ortho, meta or para positions relative to each other.

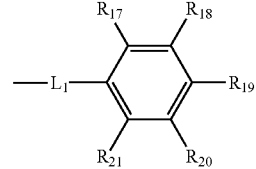

[Formula 5]

In Formula 5, $L_1$ is a single bond, an oxygen atom, a sulfur atom, —S(=O)$_2$—, a carbonyl group, an alkylene group, an alkenylene group, an alkynylene group, —C(=O)—X$_3$— or —X$_3$—C(=O)—, where X$_3$ is an oxygen atom, a sulfur atom, —S(=O)$_2$—, an alkylene group, an alkenylene group or an alkynylene group, and $R_{17}$ and $R_{21}$ are each independently hydrogen, an alkyl group, an alkoxy group, an aryl group or a cyano group, provided that two or more or two of $R_{17}$ to $R_{21}$ are each a cyano group. Cyano groups in which at least two are present in Formula 5 may be present at ortho, meta or para positions relative to each other.

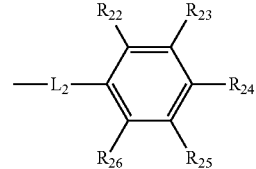

[Formula 6]

In Formula 6, $L_2$ is a single bond, an oxygen atom, a sulfur atom, —S(=O)$_2$—, a carbonyl group, an alkylene group, an alkenylene group, an alkynylene group, —C(=O)—X$_4$— or —$X_4$—C(=O)—, where $X_4$ is an oxygen atom, a sulfur atom, —S(=O)$_2$—, an alkylene group, an alkenylene group or an alkynylene group, and $R_{22}$ and $R_{26}$ are each independently hydrogen, an alkyl group, an alkoxy group, an aryl group or a substituent of Formula 5 above, provided that at least one or one of $R_{22}$ to $R_{26}$ is a substituent of Formula 5 above. The substituent of Formula 5 which at least one is present in Formula 6 may exist at an ortho, meta or para position based on $L_2$.

When Formula 5 or 6 is present, $L_1$ of Formula 5 above may be linked to Formula 4 or 6, or $L_2$ of Formula 6 may be linked to Formula 4.

The polymerizable composition further comprises a curing agent, where as the curing agent, a compound of Formula 1 below may be used. The curing agent of Formula 1 can impart heat resistance and rigidity to the phthalonitrile resin by its unique chemical structure, and this property can be adjusted, as needed, by controlling the number of repeating units.

[Formula 1]

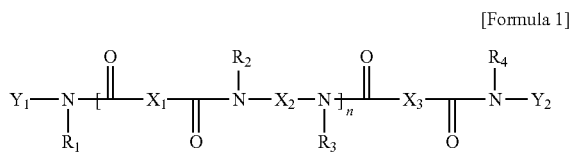

In Formula 1, $X_1$ to $X_3$ are each the same or different aromatic divalent radical, $Y_1$ and $Y_2$ are each an aryl group substituted with at least one amine group, where $Y_1$ and $Y_2$ may be the same or different from each other, and $R_1$ to $R_4$ are each independently a hydrogen atom, an alkyl group, an alkoxy group or an aryl group and n is a number in a range of 0 to 20.

In the present application, the term alkyl group or alkoxy group may be an alkyl group or alkoxy group having 1 to 20 carbon atoms, 1 to 16 carbon atoms, 1 to 12 carbon atoms, 1 to 8 carbon atoms or 1 to 4 carbon atoms, unless otherwise specified. The alkyl or alkoxy group may be linear, branched or cyclic, which may be optionally substituted with one or more substituents. In the present application, in the range of the term alkyl group, a haloalkyl group may also be included, which is described below.

In the present application, the term alkylene group or alkylidene group may mean an alkylene group or alkylidene group having 1 to 20 carbon atoms, 1 to 16 carbon atoms, 1 to 12 carbon atoms, 1 to 8 carbon atoms or 1 to 4 carbon atoms, unless otherwise specified. The alkylene group or alkylidene group may be linear, branched or cyclic. In addition, the alkylene group or alkylidene group may be optionally substituted with one or more substituents.

Also, in the present application, the term aryl group may mean a monovalent substituent derived from an aromatic compound to be described below, and the aromatic divalent radical may also mean a divalent substituent derived from an aromatic compound to be described below.

Here, the aromatic compound can be exemplified by benzene, a compound comprising benzene or a derivative of any one of the foregoing. Here, the compound comprising benzene may mean a compound having a structure in which two or more benzene rings are condensed while sharing one or two carbon atoms, or directly linked, or a structure in which they are linked by an appropriate linker. Here, the linker applied to linking two benzene rings may be exemplified by an alkylene group, an alkylidene group, an oxygen atom, a sulfur atom, a carbonyl group, —$NR_{11}$—, —S(=O)—, —S(=O)$_2$—, —C(=O)—O-$L_1$-O—C(=O)—, -$L_2$-C(=O)—O-$L_3$-, -$L_4$-O—C(=O)-$L_5$- or -$L_6$-$Ar_1$-$L_7$-$Ar_2$-$L_8$-, and the like. Here, $L_1$ to $L_8$ may be each independently a single bond, an oxygen atom, an alkylene group or an alkylidene group, $Ar_1$ and $Ar_2$ may be each independently an arylene group, and $R_{11}$ may be hydrogen, an alkyl group, an alkoxy group or an aryl group.

The aromatic compound may comprise, for example, 6 to 30, 6 to 28, 6 to 27, 6 to 25, 6 to 20 or 6 to 12 carbon atoms, and may be optionally substituted with one or more substituents. For example, the aromatic compound forming $Y_1$ and/or $Y_2$ is substituted with at least one amine group. Here, when the aromatic compound comprises the above-described linker, the number of carbon atoms in the compound is a number including the carbon atoms present in the linker as well.

In the present application, an example of the substituent which may optionally be substituted in the alkyl group and the like may be exemplified by halogen such as chlorine or fluorine, an epoxy group such as a glycidyl group, an epoxyalkyl group, a glycidoxyalkyl group or an alicyclic epoxy group, an acryloyl group, a methacryloyl group, an isocyanate group, a thiol group, an alkyl group, an alkoxy group or an aryl group, and the like, but is not limited thereto.

In the present application, the term single bond means a case where there is no atom at the relevant site. For example, in a structure of X—Y—Z, when Y is a single bond, X and Z are directly linked to form a structure of X—Z.

In another example, n in Formula 1 may be 19 or less, 18 or less, 17 or less, 16 or less, 15 or less, 14 or less, 13 or less, 12 or less, 11 or less, 10 or less, 9 or less, 8 or less, 7 or less, 5 or less, or 4 or less.

In one example, the aromatic divalent radicals of $X_1$ to $X_3$ in Formula 1 may be the same or different from each other and the aryl groups of $Y_1$ and $Y_2$ may also be the same or different from each other. In one example, such a divalent radical or aryl group may be a divalent radical or aryl group derived from a compound represented by Formula 2 or 3 below. Radicals are formed at the divalent radical or the aryl group, for example, at any two or one site of $R_1$ to $R_6$ in Formula 2 below, or any two or one site of $R_1$ to $R_{10}$ in Formula 3 below, where the formed radicals may be each linked to a carbonyl group or nitrogen atom, and the like of Formula 1. Furthermore, when the aryl group of $Y_1$ and $Y_2$ is derived from Formula 2 or 3 below, the compound of Formula 2 or 3 below comprises at least one amine group.

[Formula 2]

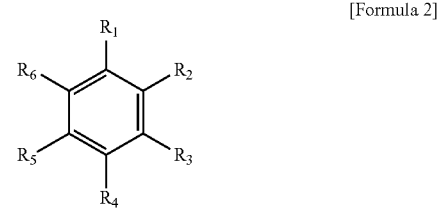

In Formula 2, $R_1$ to $R_6$ are each independently hydrogen, an alkyl group, an alkoxy group, an aryl group, a hydroxy group, an amine group or a carboxyl group. In one example, when $Y_1$ or $Y_2$ in Formula 1 is derived from Formula 2 above, at least one of $R_1$ to $R_6$ is an amine group.

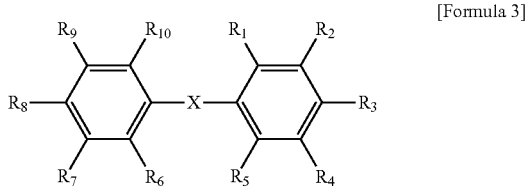

[Formula 3]

In Formula 3, $R_1$ to $R_{10}$ are each independently hydrogen, an alkyl group, an alkoxy group, a hydroxy group, a carboxyl group, an amine group or an aryl group, and X is a single bond, an alkylene group, an alkylidene group, an oxygen atom, a sulfur atom, a carbonyl group, $—NR_{11}—$, $—S(=O)—$, $—S(=O)_2—$, $-L_9$-$Ar_3$-$L_{10}$- or $-L_9$-$Ar_3$-$L_{10}$-$Ar_4$-$L_{11}$-, where $R_{11}$ is hydrogen, an alkyl group, an alkoxy group or an aryl group, Ara and $Ar_4$ are arylene groups and $L_9$ to $L_{11}$ are each independently a single bond, an oxygen atom, an alkylene group or an alkylidene group. Also, when $Y_1$ or $Y_2$ in Formula 1 is derived from Formula 3, at least one of $R_1$ to $R_{10}$ is an amine group.

The compound of Formula 2 may be exemplified by benzene or benzene substituted with an amine group, but is not limited thereto.

Also, the compound of Formula 3 may be exemplified by biphenyl, phenyloxybenzene, biphenyl substituted with an amine group or phenyloxybenzene substituted with an amine group, and the like, but is not limited thereto.

In one example, the aromatic divalent radical or aryl group may be phenylene, phenyl or aminophenyl, and the like, which is liberated from Formula 2, but is not limited thereto. When the divalent radical is phenylene, sites where the two radicals are formed may be ortho, meta or para positions relative to each other.

The compound of Formula 1 can be synthesized according to a known synthesis method of organic compounds, and for example, can be synthesized by a dehydration condensation method of a diamine compound and a dicarboxylic acid compound, or the like.

The compound of Formula 1 may have excellent heat resistance. Accordingly, in one example, the compound may have a decomposition temperature of 200° C. or higher, 300° C. or higher, 350° C. or higher, or 400° C. or higher. In the present application, the term decomposition temperature may mean a temperature at which the decomposition rate of the compound of Formula 1 is maintained in the range of 10% or less, 5% or less, or 1% or less. The upper limit of the decomposition temperature is not particularly limited and may be, for example, about 1,000° C. or lower, 900° C. or lower, or 800° C. or lower.

The ratio of the curing agent in the polymerizable composition is not particularly limited. The above ratio can be adjusted so that the desired curability can be ensured in consideration of, for example, the ratio or kind of the curable component such as the phthalonitrile compound contained in the composition. For example, the curing agent may be included in about 0.02 mol to 1.5 mol per mole of the phthalonitrile compound contained in the polymerizable composition. However, the above ratio is only an example of the present application. Usually, the process window tends to become narrow if the ratio of the curing agent in the polymerizable composition is high, while the curing property tends to become insufficient if the ratio of the curing agent is low, so that the suitable ratio of the curing agent can be selected in consideration of these points, and the like.

The polymerizable composition of the present application exhibits proper curing property, melting temperature and process window through using the compound of Formula 1, and it is possible to provide a polymerizable composition and a prepolymer capable of forming a composite having excellent physical properties such as heat resistance and rigidity.

Thus, in one example, the processing temperature of the polymerizable composition may be in the range of 150° C. to 350° C. In the present application, the term processing temperature may mean a temperature at which the compound, the following polymerizable composition or prepolymer containing it, etc. is present in a processable state. Such a processing temperature may be, for example, a melting temperature (Tm) or a glass transition temperature (Tg). In this case, the process window of the polymerizable composition, that is, the absolute value of the difference (Tc–Tp) between the processing temperature (Tp) and the curing temperature (Tc) of the phthalonitrile compound and the compound of Formula 1, may be 30° C. or higher, 50° C. or higher, or 100° C. or higher. In one example, the curing temperature (Tc) may be higher than the processing temperature (Tp). Such a range may be advantageous, for example, for securing proper workability in the process of producing a composite to be described below by using a polymerizable composition. The upper limit of the process window is not particularly limited, but for example, the absolute value of the difference (Tc–Tp) between the processing temperature (Tp) and the curing temperature (Tc) may be 400° C. or lower or 300° C. or lower.

The polymerizable composition may further comprise various additives. As an example of such an additive, various fillers may be exemplified. The kind of the material that can be used as the filler is not particularly limited, and any known filler suitable for the intended use may be used. Exemplary fillers include a metal material, a ceramic material, glass, a metal oxide, a metal nitride or a carbon-based material, but are not limited thereto. In addition, the form of the filler is also not particularly limited and may be various forms, such as fibrous materials such as aramid fibers, glass fibers, carbon fibers or ceramic fibers, or woven fabrics, nonwoven fabrics, cords or strings, formed by the material, particles containing nanoparticles, polygons or other amorphous forms. As an example of the carbon-based material, graphite, graphene, or carbon nanotubes, and the like, or derivatives or isomers such as their oxides, and the like may be exemplified.

The polymerizable composition may comprise, in addition to the fillers, various monomers known to be applicable to the production of so-called engineering plastics such as polyimide, polyamide, polystyrene and the like, or other additives without limitation depending on the purpose.

The present application also relates to a prepolymer formed by the reaction of the polymerizable composition, that is, the polymerizable composition comprising the phthalonitrile compound and the compound of Formula 1.

In the present application, the term prepolymer state may mean a state in which the reaction of the phthalonitrile compound with the compound of the Formula 1 occurs in the polymerizable composition to some extent (for example, a stage in which the polymerization of a so-called A or B stage step occurs), or a state which does not reach the fully polymerized state and exhibits appropriate fluidity, and thus, for example, is possible to process the composite, as described below. In one example, the prepolymer state may mean a state in which the polymerization of the polymerizable composition proceeds to some extent and for which a melt viscosity measured at a temperature in the range of about 150° C. to 250° C. is 100 cP to 50,000 cP, 100 cP to 10,000 cP or 100 cP to 5000 cP.

The prepolymer may also exhibit excellent curing property, a low melting temperature and a wide process window.

For example, the processing temperature of the prepolymer may be in the range of 150° C. to 350° C. In this case, the process window of the prepolymer, that is, the absolute value of the difference (Tc−Tp) between the processing temperature (Tp) and the curing temperature (Tc) may be 30° C. or higher, 50° C. or higher, or 100° C. or higher. In one example, the curing temperature (Tc) may be higher than the processing temperature (Tp). Such a range may be advantageous, for example, for securing proper workability in the process of producing a composite to be described below by using the prepolymer. The upper limit of the process window is not particularly limited, but for example, the absolute value of the difference (Tc−Tp) between the processing temperature (Tp) and the curing temperature (Tc) may be 400° C. or lower or 300° C. or lower.

The prepolymer may further comprise any known additives in addition to the above components. As an example of such an additive, the above-mentioned fillers and the like may be exemplified, without being limited thereto.

The present application also relates to a phthalonitrile resin which is a polymer of said polymerizable composition. Such a resin can be formed, for example, by polymerizing the above-described polymerizable composition or prepolymer.

The present application also relates to a composite. The composite may comprise the above-described phthalonitrile resin and the filler. As described above, if the polymerizable composition of the present application is used, it is possible to achieve appropriate curing property, melt temperature and process window, and to prevent voids and the like that can adversely affect the physical properties even at high temperatures applied in the process of forming the composite or the resin, whereby a so-called reinforced polymer composite having excellent physical properties can be easily formed. The composite thus formed may comprise the phthalonitrile resin and the filler, and may be applied to various applications including durables for automobiles, airplanes, ships, and the like.

The kind of the filler is not particularly limited and may be suitably selected in consideration of the intended use. As the usable filler, fibrous materials such as carbon fibers, aramid fibers, glass fibers or ceramic fibers, or woven fabrics, non-woven fabrics, cords or strings, formed by the material, or carbon nanomaterials such as carbon nanotubes or graphene, and the like may be exemplified, without being limited thereto.

The ratio of the filler is not particularly limited, and may be set in an appropriate range according to the intended use.

The present application also relates to a precursor for preparing the composite, wherein the precursor may comprise, for example, the polymerizable composition described above and the filler, or the prepolymer described above and the filler.

The composite can be prepared in a known manner using the precursor. For example, the composite can be formed by curing the precursor.

In one example, the precursor may be prepared by blending the polymerizable composition or the prepolymer, which is prepared by compounding a phthalonitrile compound with the compound of Formula 1 in a molten state, with the filler in a state molten by heating or the like. For example, the above-described composite may be prepared by molding the precursor produced as above into a desired shape and then curing it. A method of forming a prepolymer or the like in the above process, a process for preparing a composite by compounding such a prepolymer and the like with a filler, and processing and curing it may be carried out according to a known method.

Advantageous Effects

The present application can provide a polymerizable composition, a prepolymer and a phthalonitrile resin capable of forming a composite showing proper curing property, melting temperature and process window and having excellent physical properties such as heat resistance and rigidity.

BRIEF DESCRIPTION OF DRAWINGS

FIGS. 1 to 14 are results of NMR measurement for compounds prepared in Preparation Examples.

MODE FOR INVENTION

Hereinafter, the polymerizable composition or the like of the present application will be specifically described by way of Examples and Comparative Examples, but the scope of the polymerizable composition and the like is not limited to the following Examples.

1. NMR (Nuclear Magnetic Resonance) Analysis

NMR analysis was carried out by using a 500 MHz NMR equipment from Agilent as the manufacturer's manual. A sample for NMR measurement was prepared by dissolving the compound in DMSO (dimethyl sulfoxide)-d6.

2. DSC (Differential Scanning Calorimetry) Analysis

DSC analysis was carried out in a $N_2$ flow atmosphere using a Q20 system from TA instrument while raising the temperature from 35° C. to 400° C. at a heating rate of 10° C./min.

3. TGA (Thermogravimetric Analysis) Analysis

TGA analysis was performed using a TGA e850 instrument from Mettler-Toledo. In the case of the compounds prepared in Preparation Examples, they were analyzed in a $N_2$ flow atmosphere while raising the temperature from 25° C. to 800° C. at a heating rate of 10° C./min.

Preparation Example 1. Synthesis of Compound (Pn1)

A compound of Formula A below was synthesized in the following manner. 32.7 g of a compound of Formula B below and 120 g of DMF (dimethylformamide) were introduced into a 3 neck RBF (round bottom flask) and dissolved by stirring at room temperature. Subsequently, 51.9 g of a compound of Formula C was added and 50 g of DMF was added, and then dissolved by stirring. Subsequently, 62.2 g of potassium carbonate and 50 g of DMF were added together and the temperature was raised to 85° C. with stirring. After reacting for about 5 hours in the above state, it was cooled to room temperature. The cooled reaction solution was neutralized and precipitated by pouring it into a 0.2N hydrochloric acid aqueous solution, and washed with water after filtering. The filtered reactant was then dried in a vacuum oven at 100° C. for 1 day, and after removing water and the residual solvent, a compound (PN1) of Formula A below was obtained in a yield of about 80 wt %. The NMR results for the compound of Formula A above were described in FIG. 1.

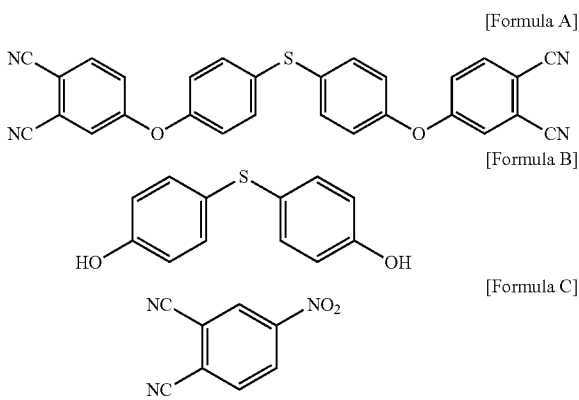

[Formula A]

[Formula B]

[Formula C]

Preparation Example 2. Synthesis of Compound (PN2)

A compound of Formula D below was synthesized in the following manner. 28.0 g of 4,4'-bis(hydroxyphenyl)methane and 150 mL of DMF (dimethylformamide) were introduced into a 500 mL 3 neck RBF (round bottom flask) and dissolved at room temperature. Subsequently, 48.5 g of 4-nitrophthalonitrile was added to the mixture and 50 g of DMF was added, and then dissolved by stirring. Subsequently, 58.1 g of potassium carbonate and 50 g of DMF were added together and the temperature was raised to 85° C. with stirring. After reacting for about 5 hours, it was cooled to room temperature. The cooled reaction solution was neutralized and precipitated by pouring it into a 0.2N hydrochloric acid aqueous solution, and washed with water after filtering. The filtered reactant was then dried in a vacuum oven at 100° C. for 1 day, and after removing water and the residual solvent, the target compound (PN2) was obtained in a yield of about 83 wt %. The NMR results for the compound (PN2) of Formula D above were described in FIG. 2.

[Formula D]

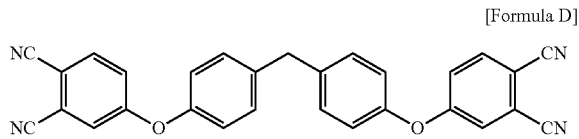 [SMILES: N#Cc1ccc(Oc2ccc(Cc3ccc(Oc4ccc(C#N)c(C#N)c4)cc3)cc2)cc1C#N]

Preparation Example 3. Synthesis of Compound (CA1)

A compound (CA1) of Formula E below was synthesized in the following manner. 53.2 g of a compound of Formula F below and 80.1 g of a compound of Formula G below were introduced into a 3 neck RBF (round bottom flask) and the temperature was raised to 260° C. The mixture was reacted for about 1 hour while removing $H_2O$ generated in the above state. Subsequently, the reactant was cooled to room temperature to obtain a blue solid. The obtained solid was triturated and then dried in a vacuum oven after removing the residual monomer using MeOH (methanol) and filtering to yield a compound (CA1) of Formula E below in a yield of about 88 wt %. The NMR results for the compound of Formula E were described in FIG. 3. Considering the amount of the monomer used, n in Formula E below was theoretically 3, but it was confirmed to be 3.5 in NMR. This difference is presumed to be because during the reaction the substance of Formula G has sublimated at high temperature.

[Formula E]

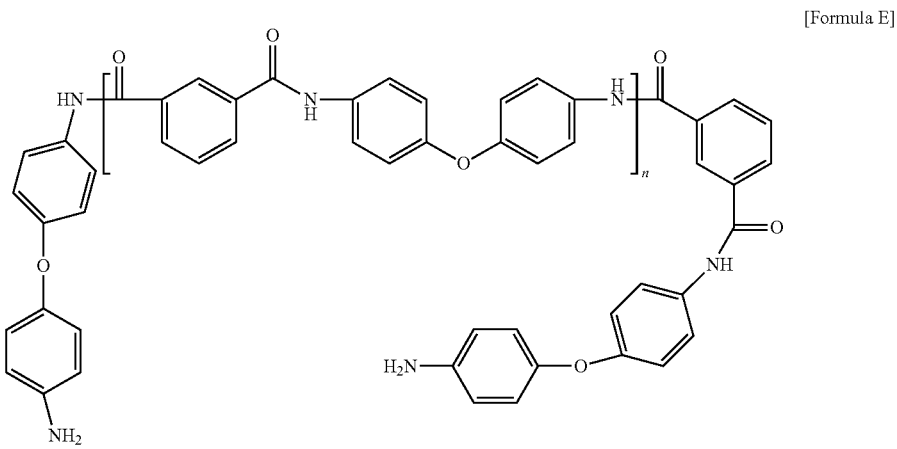

In Formula E, n is about 3.5.

[Formula F]

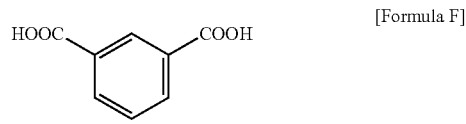

[Formula G]

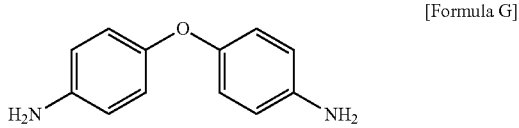

Preparation Example 4. Synthesis of Compound (CA2)

A compound (CA2) in which n in Formula E of Preparation Example 3 was about 0 to 1.5 was synthesized in the following manner. 33.2 g of the compound of Formula F in Preparation Example 3 and 80.1 g of the compound of Formula G were introduced into a 3 neck RBF (round bottom flask) and the temperature was raised to 260° C. The mixture was reacted for about 1 hour while removing H₂O generated in the above state. Subsequently, the reactant was cooled to room temperature to obtain a blue solid. The obtained solid was triturated and then dried in a vacuum oven after removing the residual monomer using MeOH (methanol) and filtering to yield a compound (CA2) of Formula E, in which n in Formula E of Preparation Example 3 was 0 to 1.5, in a yield of about 86 wt %. The NMR results for the compound (CA2) were described in FIG. 4. Considering the amount of the monomer used, n in the compound (CA2) was theoretically 0, but it was confirmed to be about 1.5 in NMR. This difference is presumed to be because during the reaction the substance of Formula G has sublimated at high temperature.

Preparation Example 5. Synthesis of Compound (CA3)

A compound (CA3) in which n in Formula E of Preparation Example 3 was about 0 to 0.5 was synthesized in the following manner. 28.2 g of the compound of Formula F in Preparation Example 3 and 136.2 g of the compound of Formula G were introduced into a 3 neck RBF (round bottom flask) and the temperature was raised to 260° C. The mixture was reacted for about 1 hour while removing H₂O generated in the above state. Subsequently, the reactant was cooled to room temperature to obtain a blue solid. The obtained solid was triturated and then dried in a vacuum oven after removing the residual monomer using MeOH (methanol) and filtering to yield a compound (CA2) of Formula E, in which n in Formula E of Preparation Example 3 was 0 to 0.5, in a yield of about 93 wt %. The NMR results for the compound (CA2) were described in FIG. 5. In order to obtain a compound, in which n in Formula E was 0, an excessive amount of the compound of Formula G was added, but it was confirmed to be about 0.5 in NMR. This difference is presumed to be because the compound of Formula E, to which two or more compounds of Formula F have been introduced, has been generated due to the high-temperature reaction.

Preparation Example 6. Synthesis of Compound (CA4)

A compound (CA4) of Formula H below was synthesized in the following manner. 66.4 g of the compound of Formula F in Preparation Example 3 and 54.1 g of a compound of Formula I below were introduced into a 3 neck RBF (round bottom flask) and the temperature was raised to 260° C. The mixture was reacted for about 1 hour while removing H₂O generated in the above state. Subsequently, the reactant was cooled to room temperature to obtain an orange solid. The obtained solid was triturated and then dried in a vacuum oven after removing the residual monomer using MeOH (methanol) and filtering to yield a compound (CA4) of Formula H below in a yield of about 85 wt %. The NMR results for the compound of Formula H were described in FIG. 6. Considering the amount of the monomer used, n in Formula H below was theoretically 3, but it was confirmed to be 4 in NMR. This difference is presumed to be because during the reaction the substance of Formula I has sublimated at high temperature.

[Formula H]

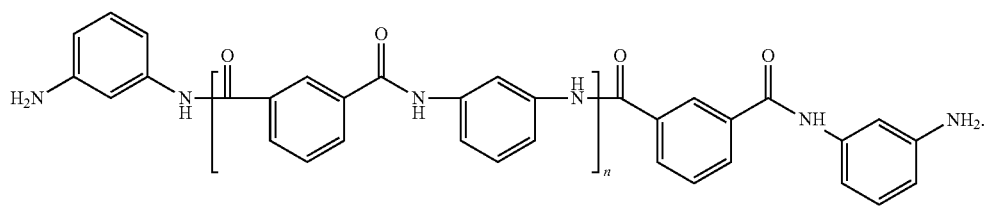

In Formula E, n is about 4.

[Formula I]

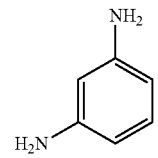

Preparation Example 7. Synthesis of Compound (CA5)

A compound (CA5) in which n in Formula H of Preparation Example 6 was about 0 to 1.5 was synthesized in the following manner. 41.5 g of the compound of Formula F in Preparation Example 3 and 54.1 g of the compound of Formula I in Preparation Example 5 were introduced into a 3 neck RBF (round bottom flask) and the temperature was raised to 260° C. The mixture was reacted for about 1 hour while removing H₂O generated in the above state. Subsequently, the reactant was cooled to room temperature to obtain a red solid. The obtained solid was triturated and then dried in a vacuum oven after removing the residual monomer using MeOH (methanol) and filtering to yield a compound (CA5) in a yield of about 80 wt %. The NMR results for the compound (CA5) were described in FIG. 7. Considering the amount of the monomer used, n in the compound (CA5) was theoretically 0, but it was confirmed to be about 1.5 in NMR. This difference is presumed to be because during the reaction the substance of Formula I has sublimated at high temperature.

Preparation Example 8. Synthesis of Compound (CA6)

A compound (CA6) in which n in Formula H of Preparation Example 6 was about 0 to 0.7 was synthesized in the following manner. 58.1 g of the compound of Formula F in Preparation Example 3 and 113.5 g of the compound of Formula I in Preparation Example 5 were introduced into a 3 neck RBF (round bottom flask) and the temperature was raised to 260° C. The mixture was reacted for about 1 hour while removing H₂O generated in the above state. Subsequently, the reactant was cooled to room temperature to obtain a red solid. The obtained solid was triturated and then dried in a vacuum oven after removing the residual monomer using MeOH (methanol) and filtering to yield a compound (CA6) in a yield of about 92 wt %. The NMR results for the compound (CA6) were described in FIG. 8. In order to obtain a compound, in which n in Formula H was 0, an excessive amount of the compound of Formula I was added, but it was confirmed to be about 0.7 in NMR. This difference is presumed to be because the compound of Formula E, to which two or more compounds of Formula F have been introduced, has been generated due to the high-temperature reaction.

Preparation Example 9 Synthesis of Compound (CA7)

A compound (CA7) of Formula J below was synthesized in the following manner. 25 g of the compound of Formula F in Preparation Example 3 and 154 g of a compound of Formula K below were introduced into a 3 neck RBF (round bottom flask) and the temperature was raised to 260° C. The mixture was reacted for about 1 hour while removing H₂O generated in the above state. Subsequently, the reactant was cooled to room temperature to obtain a white solid. The obtained solid was triturated and then dried in a vacuum oven after removing the residual monomer using diethyl ether and filtering to yield a compound (CA7) of Formula J below in a yield of about 89 wt %. The NMR results for the compound of Formula J were described in FIG. 9. In order to obtain a compound, in which n in Formula J was 0, an excessive amount of the compound of Formula K was added, but it was confirmed to be about 0.7 in NMR. This difference is presumed to be because the compound of Formula E, to which two or more compounds of Formula F have been introduced, has been generated due to the high-temperature reaction.

[Formula J]

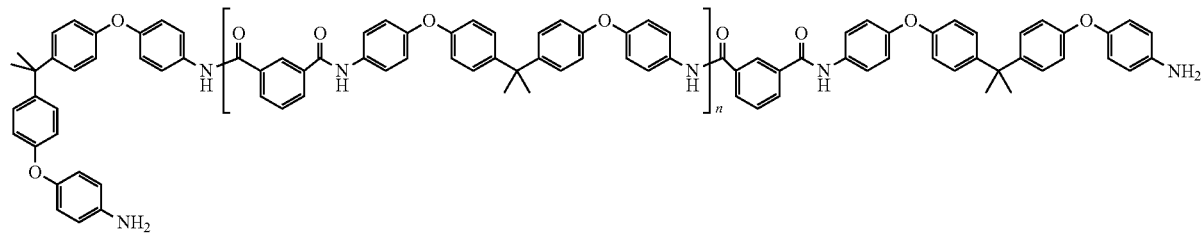

In Formula J, n is about 0.7.

[Formula K]

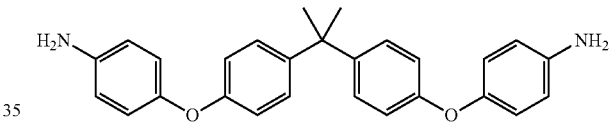

Preparation Example 10 Synthesis of Compound (CA8)

A compound (CA8) of Formula L below was synthesized in the following manner. 33.2 g of a compound of Formula M below and 80.1 g of the compound of Formula G in Preparation Example 3 were introduced into a 3 neck RFB (round bottom flask) and the temperature was raised to 260° C. The mixture was reacted for about 1 hour while removing H₂O generated in the above state. Subsequently, the reactant was cooled to room temperature to obtain a blue solid. The obtained solid was triturated and then dried in a vacuum oven after removing the residual monomer using methanol and filtering to yield a compound (CA8) of Formula L below in a yield of about 85 wt %. The NMR results for the compound of Formula L were described in FIG. 10. In order to obtain a compound, in which n in Formula L was 0, an excessive amount of the compound of Formula G was added, but it was confirmed to be about 0.5 in NMR. This difference is presumed to be because the compound, to which two or more compounds of Formula M have been introduced, has been generated due to the high-temperature reaction.

[Formula L]

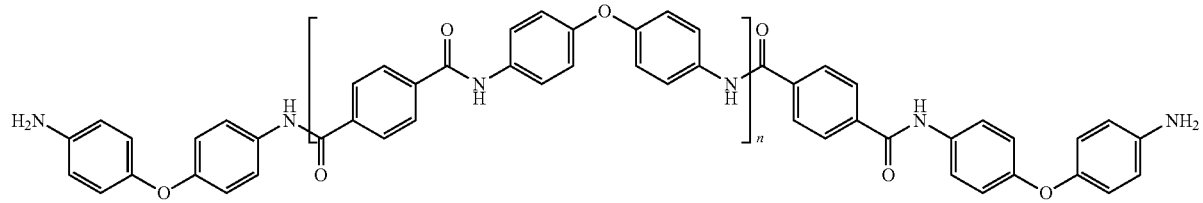

In Formula L, n is about 0.5.

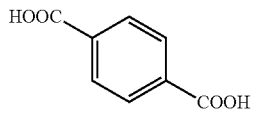
[Formula M]

Preparation Example 11. Synthesis of Compound (CA9)

A compound (CA9) of Formula N below was synthesized in the following manner. 58.1 g of the compound of Formula M in Preparation Example 10 and 94.6 g of the compound of Formula I in Preparation Example 6 were introduced into a 3 neck RBF (round bottom flask) and the temperature was raised to 260° C. The mixture was reacted for about 1 hour while removing H₂O generated in the above state. Subsequently, the reactant was cooled to room temperature to obtain a red solid. The obtained solid was triturated and then dried in a vacuum oven after removing the residual monomer using methanol and filtering to yield a compound (CA9) of Formula N below in a yield of about 87 wt %. The NMR results for the compound of Formula N were described in FIG. 11. In order to obtain a compound, in which n in Formula N was 0, an excessive amount of the compound of Formula G was added, but it was confirmed to be about 1.2 in NMR. This difference is presumed to be because the reaction has proceeded rapidly due to the high-temperature reaction and the compound of Formula I has easily sublimed, thereby generating the compound to which two or more compounds of Formula M have been introduced.

Preparation Example 12. Synthesis of Compound (CA10)

A compound (CA10) of Formula O was synthesized in the following manner. 25 g of the compound of Formula M in Preparation Example 10 and 154 g of the compound of Formula K in Preparation Example 9 were introduced into a 3 neck RBF (round bottom flask) and the temperature was raised to 260° C. The mixture was reacted for about 1 hour while removing H₂O generated in the above state. Subsequently, the reactant was cooled to room temperature to obtain a pale green solid. The obtained solid was triturated and then dried in a vacuum oven after removing the residual monomer using methanol and filtering to yield a compound (CA10) of Formula O below in a yield of about 85 wt %. The NMR results for the compound of Formula O were described in FIG. 12. In order to obtain a compound, in which n in Formula N was O, an excessive amount of the compound of Formula K was added, but it was confirmed to be about 0.7 in NMR.

[Formula O]

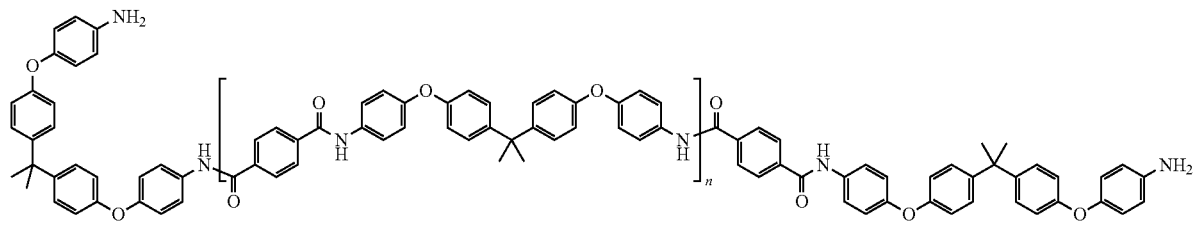

In Formula O, n is about 0.7.

Preparation Example 13. Synthesis of Compound (CA11)

A compound (CA11) of Formula P below was synthesized in the following manner. 28 g of the compound of Formula F in Preparation Example 3 and 156 g of a compound of Formula Q below were introduced into a 3 neck RBF (round bottom flask) and the temperature was raised to 260° C. The mixture was reacted for about 1 hour while removing H₂O generated in the above state. Subsequently, the reactant was cooled to room temperature to obtain a white solid. The obtained solid was triturated and then dried in a vacuum oven after removing the residual monomer using diethyl ether and filtering to yield a compound (CA11) of Formula P below in a yield of about 81 wt %. The NMR results for the compound of Formula P were described in FIG. 13. In order to obtain a compound, in which n in Formula P was 0, an excessive amount of the compound of Formula Q was added, but it was confirmed to be about 1.8 in NMR. This difference is presumed to be because the reaction has proceeded rapidly due to the high-temperature reaction and the compound, to which two or more compounds of the Formula F have been introduced, has been generated.

[Formula N]

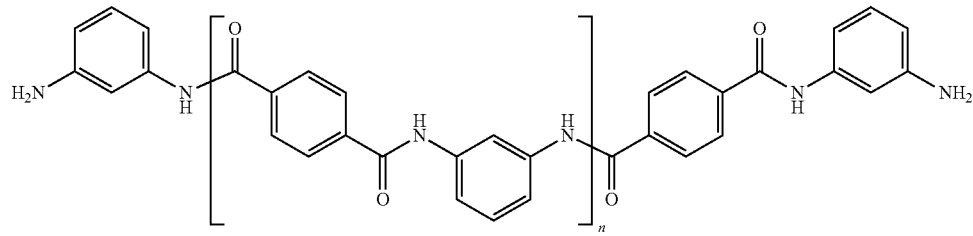

In Formula N, n is about 1.2.

[Formula P]

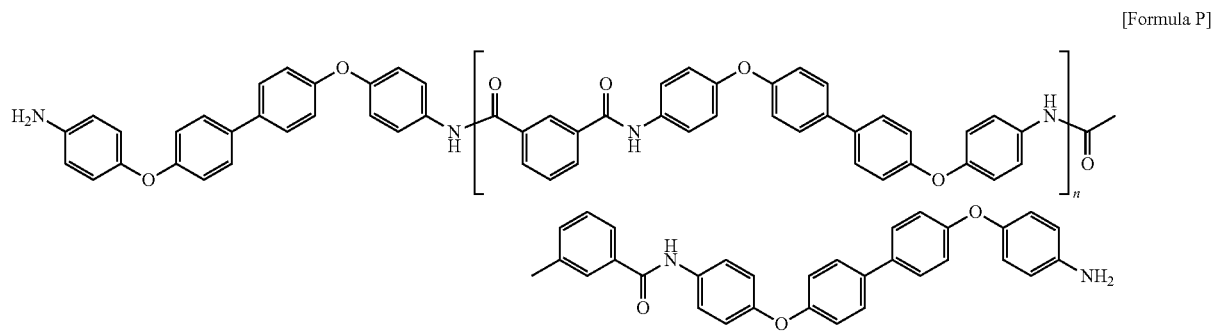

In Formula P, n is about 1.8.

[Formula Q]

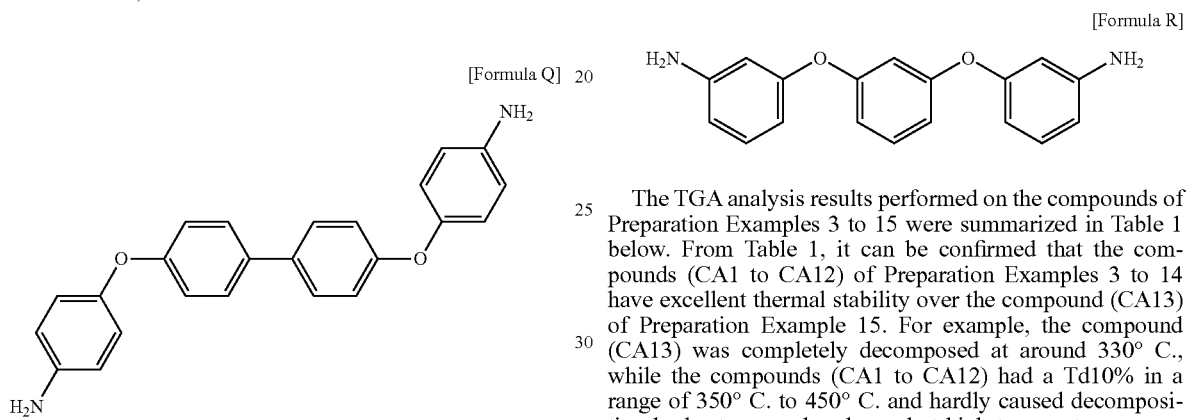

[Formula R]

Preparation Example 14. Synthesis of Compound (CA12)

A compound (CA14), in which n in Formula E of Preparation Example 3 was about 0.9, was synthesized through Yamazaki reaction. 14 g of LiCl, 100 g of NMP and 41 g of pyridine were introduced into a 3 neck RBF (round bottom flask) in turn, and the temperature was raised to 100° C. Subsequently, 17 g of the compound of Formula F in Preparation Example 3 and 44 g of the compound of Formula G in Preparation Example 3 were added to the 3 neck RBF (round bottom flask) and 62 g of triphenylphosphine was further added thereto. The reactant was stirred at 100° C. for about 3 hours. After the reaction, the reactant was cooled to room temperature and precipitated in methanol to obtain a yellow solid. The obtained solid was filtered and then dried in a vacuum oven to obtain a compound (CA12), in which n in Formula E of Preparation Example 3 was about 0.9, in a yield of about 78 wt %. The NMR results for this compound (CA12) were described in FIG. 14. Considering the amount of the monomer used, n in Formula E below was theoretically 0, but it was confirmed to be 0.9 in NMR.

Preparation Example 15. Compound (CA13)

A compound of Formula R below was commercially available from TCI (Tokyo Chemical Industry Co., Ltd.) and used without further purification.

The TGA analysis results performed on the compounds of Preparation Examples 3 to 15 were summarized in Table 1 below. From Table 1, it can be confirmed that the compounds (CA1 to CA12) of Preparation Examples 3 to 14 have excellent thermal stability over the compound (CA13) of Preparation Example 15. For example, the compound (CA13) was completely decomposed at around 330° C., while the compounds (CA1 to CA12) had a Td10% in a range of 350° C. to 450° C. and hardly caused decomposition by heat even when burned at high temperature.

TABLE 1

|  |  | Td10% (° C.) | Residue (at 800° C.) (%) | Td100% (° C.) |
| --- | --- | --- | --- | --- |
| Preparation Example 3 | CA 1 | 449.5 | 43.8 |  |
| Preparation Example 4 | CA 2 | 408.7 | 42.8 |  |
| Preparation Example 5 | CA 3 | 395 | 39.3 |  |
| Preparation Example 6 | CA 4 | 425.8 | 51.5 |  |
| Preparation Example 7 | CA 5 | 404.1 | 44.3 |  |
| Preparation Example 8 | CA 6 | 389.2 | 47.7 |  |
| Preparation Example 9 | CA 7 | 435.8 | 29.7 |  |
| Preparation Example 10 | CA 8 | 378 | 35.5 |  |
| Preparation Example 11 | CA 9 | 358.6 | 40.3 |  |
| Preparation Example 12 | CA 10 | 442.3 | 30.4 |  |
| Preparation Example 13 | CA 11 | 449.3 | 42.0 |  |
| Preparation Example 14 | CA 12 | 349.2 | 53.3 |  |
| Preparation Example 15 | CA 13 | 264 | 0 | 331 |

Also, from the above results, it can be confirmed that the higher the molecular weight, the thermal stability is more improved and it can be seen that the thermal stability can be controlled depending on the structure and the type of the monomer. From Table 1, it can be confirmed that the compounds of the specific structure of the present application can sufficiently obtain desired heat resistance and thermal stability even at a low molecular weight and can prevent thermal decomposition at a burning temperature, which is a problem upon using conventional curing agents of monomolecular materials, to obtain better curing efficiency and excellent physical properties.

Example 1

To the compound (PN1) of Preparation Example 1, about 12 mol % of the compound (CA2) of Preparation Example 4 was added relative to the used amount of the compound (PN1) and mixed well to prepare a polymerizable composition. The composition was subjected to a DSC analysis to measure the processing temperature and the curing initiation temperature and to confirm the process window of the temperature difference. The relevant results are described in Table 2, and if the polymerizable composition is melted at about 240° C. and stirred for 5 minutes, it is possible to prepare a prepolymer.

Example 2

To the compound (PN1) of Preparation Example 1, about 12 mol % of the compound (CA5) of Preparation Example 7 was added relative to the used amount of the compound (PN1) and mixed well to prepare a polymerizable composition. The composition was subjected to a DSC analysis to measure the processing temperature and the curing initiation temperature and to confirm the process window of the temperature difference. The relevant results are described in Table 2, and if the polymerizable composition is melted at about 240° C. and stirred for 5 minutes, it is possible to prepare a prepolymer.

Example 3

To the compound (PN1) of Preparation Example 1, about 12 mol % of the compound (CA2) of Preparation Example 4 was added relative to the used amount of the compound (PN1) and mixed well to prepare a polymerizable composition. The composition was subjected to a DSC analysis to measure the processing temperature and the curing initiation temperature and to confirm the process window of the temperature difference. The relevant results are described in Table 2, and if the polymerizable composition is melted at about 240° C. and stirred for 5 minutes, it is possible to prepare a prepolymer.

Example 4

To the compound (PN2) of Preparation Example 2, about 12 mol % of the compound (CA5) of Preparation Example 7 was added relative to the used amount of the compound (PN2) and mixed well to prepare a polymerizable composition. The composition was subjected to a DSC analysis to measure the processing temperature and the curing initiation temperature and to confirm the process window of the temperature difference. The relevant results are described in Table 2, and if the polymerizable composition is melted at about 240° C. and stirred for 5 minutes, it is possible to prepare a prepolymer.

Comparative Example 1

To the compound (PN1) of Preparation Example 1, about 12 mol % of the compound (CA13) of Preparation Example 15 was added relative to the used amount of the compound (PN1) and mixed well to prepare a polymerizable composition. The composition was subjected to a DSC analysis to measure the processing temperature and the curing initiation temperature and to confirm the process window of the temperature difference. The relevant results are described in Table 2, and if the polymerizable composition is melted at about 240° C. and stirred for 5 minutes, it is possible to prepare a prepolymer.

Comparative Example 2

To the compound (PN2) of Preparation Example 2, about 12 mol % of the compound (CA13) of Preparation Example 15 was added relative to the used amount of the compound (PN2) and mixed well to prepare a polymerizable composition. The composition was subjected to a DSC analysis to measure the processing temperature and the curing initiation temperature and to confirm the process window of the temperature difference. The relevant results are described in Table 2, and if the polymerizable composition is melted at about 240° C. and stirred for 5 minutes, it is possible to prepare a prepolymer.

TABLE 2

|  | Processing Temperature (° C.) | Curing Initiation Temperature (° C.) | Process window (° C.) |
| --- | --- | --- | --- |
| Example 1 | 175.3 | 258.5 | 83.2 |
| Example 2 | 175.7 | 255.9 | 80.2 |
| Example 3 | 128.7 | 250.4 | 121.7 |
| Example 4 | 128.6 | 260.4 | 131.8 |
| Comparative Example 1 | 177.6 | 309.2 | 131.6 |
| Comparative Example 2 | 190.1 | 288.3 | 98.2 |

From the above results, it can be confirmed that Comparative Example 1 in the results of Examples 1 and 2 and Comparative Example 1, to which the same monomer PN1 is applied, exhibits a wider process window than Examples 1 and 2. This is because Comparative Example 1 and Examples 1 and 2 have similar processing temperatures, but Examples 1 and 2 have the curing initiation temperature lower than that of Comparative Example 1. However, it can be confirmed that the curing initiation temperature of Comparative Example 1 is extremely high, such as 310° C., whereas Examples 1 and 2 exhibit at a low value of around 255° C. Nevertheless, considering that the curing agent (CA13) applied in Comparative Example 1 is completely pyrolyzed at a temperature of about 330° C. in Table 1, it can be confirmed that it is not easy to substantially apply Comparative Example 1. In the case of Examples 1 and 2, it can be confirmed that through the application of the compounds of the specific structure, the curing initiation temperature is lowered, whereby the low-temperature curing is possible. If the curing temperature is high, special equipment to be applied at high temperature is required, and the production cost is also raised in order to achieve a high temperature. Furthermore, when the low-temperature curing is possible, it is possible to perform a rapid curing with a low viscosity at the same temperature, thereby improving workability and productivity.

In addition, it can be confirmed that Examples 3 and 4 have a low curing temperature while showing a wider process window than Comparative Example 2.

The invention claimed is:
1. A polymerizable composition comprising a phthalonitrile compound and a compound of Formula 1 below:

[Formula 1]

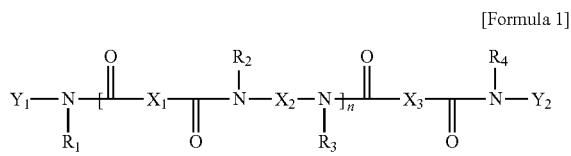

wherein, $X_1$ to $X_3$ are each the same or different aromatic divalent radical, $Y_1$ and $Y_2$ are each the same or different aryl group substituted with at least one amine group, $R_1$ to $R_4$ are each independently a hydrogen atom, an alkyl group, an alkoxy group or an aryl group and n is a number in a range of 0 to 20.

2. The polymerizable composition according to claim 1, wherein $X_1$ to $X_3$ are each a divalent radical derived from an aromatic compound having 6 to 30 carbon atoms, and $Y_1$ and $Y_2$ are each a monovalent radical derived from an aromatic compound having 6 to 30 carbon atoms.

3. The polymerizable composition according to claim 1, wherein $X_1$ to $X_3$ are each a radical derived from a compound represented by Formula 2 or 3 below or $Y_1$ and $Y_2$ are each a radical derived from a compound represented by Formula 2 or 3 below:

[Formula 2]

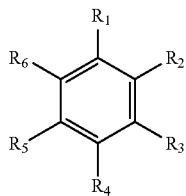

wherein, $R_1$ to $R_6$ are each independently hydrogen, an alkyl group, an alkoxy group, an aryl group, a hydroxy group, a carboxyl group or an amine group, and when $Y_1$ or $Y_2$ in Formula 1 is derived from Formula 2, at least one of $R_1$ to $R_6$ is an amine group;

[Formula 3]

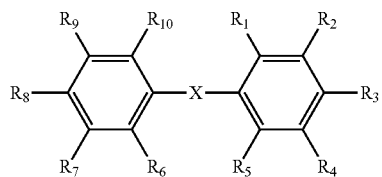

wherein, $R_1$ to $R_{10}$ are each independently hydrogen, an alkyl group, an alkoxy group, a hydroxy group, a carboxyl group, an amine group or an aryl group, and X is a single bond, an alkylene group, an alkylidene group, an oxygen atom, a sulfur atom, a carbonyl group, —$NR_{11}$—, —$S(=O)$—, —$S(=O)_2$—, -$L_9$-$Ar_3$-$L_{10}$- or -$L_9$-$Ar_3$-$L_{10}$-$Ar_4$-$L_{11}$-, where $R_{11}$ is hydrogen, an alkyl group, an alkoxy group or an aryl group, $Ar_3$ and $Ar_4$ are arylene groups and $L_9$ to $L_{11}$ are each independently a single bond, an oxygen atom, an alkylene group or an alkylidene group, and when $Y_1$ or $Y_2$ in Formula 1 is derived from Formula 3, at least one of $R_1$ to $R_{10}$ is an amine group.

4. The polymerizable composition according to claim 1, further comprising a filler.

5. The polymerizable composition according to claim 1, wherein the compound of Formula 1 is contained in an amount of about 0.02 mol to about 1.5 mol per mole of the phthalonitrile compound.

6. A prepolymer formed by the reaction of the polymerizable composition of claim 1.

7. A phthalonitrile resin formed by polymerizing the polymerizable composition of claim 1.

8. A composite comprising the phthalonitrile resin of claim 7 and a filler.

9. The composite according to claim 8, wherein the filler is a metal material, a ceramic material, glass, metal oxide, metal nitride or a carbonaceous material.

* * * * *